(12) United States Patent
Bjorkgard et al.

(10) Patent No.: US 10,927,902 B2
(45) Date of Patent: Feb. 23, 2021

(54) PNEUMATIC CLUTCH ACTUATOR

(71) Applicant: Kongsberg Automotive AS, Kongsberg (NO)

(72) Inventors: Sven Bjorkgard, Kongsberg (NO); Eivind Lund Vikebo, Kongsberg (NO); Steffen Johnsen, Drammen (NO); Kent Hall, Hyggen (NO)

(73) Assignee: KONGSBERG AUTOMOTIVE AS, Kongsberg (NO)

( * ) Notice: Subject to any disclaimer, the term of this patent is extended or adjusted under 35 U.S.C. 154(b) by 0 days.

(21) Appl. No.: 16/098,595

(22) PCT Filed: May 3, 2017

(86) PCT No.: PCT/IB2017/000582
§ 371 (c)(1),
(2) Date: Nov. 2, 2018

(87) PCT Pub. No.: WO2017/191506
PCT Pub. Date: Nov. 9, 2017

(65) Prior Publication Data
US 2020/0224735 A1    Jul. 16, 2020

Related U.S. Application Data

(60) Provisional application No. 62/331,656, filed on May 4, 2016, provisional application No. 62/420,802, filed
(Continued)

(51) Int. Cl.
*F16D 25/08* (2006.01)
*F15B 15/14* (2006.01)
*F16D 25/12* (2006.01)

(52) U.S. Cl.
CPC ........ *F16D 25/083* (2013.01); *F15B 15/1447* (2013.01); *F16D 25/126* (2013.01); *F16D 25/087* (2013.01)

(58) Field of Classification Search
CPC ... F16D 25/126; F16D 25/083; F15B 15/1447
See application file for complete search history.

(56) References Cited

U.S. PATENT DOCUMENTS 3,053,345 A    9/1962    Zindler
3,482,662 A    12/1969   Bruhn et al.
(Continued)

FOREIGN PATENT DOCUMENTS

CN    2149513 Y      12/1993
CN    105172765 A    12/2015
(Continued)

OTHER PUBLICATIONS

Machine translation of DE10330165, retrieved from http://worldwide.espacenet.com (Year: 2020).*

(Continued)

*Primary Examiner* — Stacey A Fluhart
(74) *Attorney, Agent, or Firm* — Cantor Colburn LLP

(57) ABSTRACT

A pneumatic clutch actuator includes an actuator housing, a piston assembly, a bearing carrier, and a locking element. The piston assembly is disposed within the actuator housing and is movable between a first position and a second position. The piston assembly has a piston head, an elongate member extending from the piston head, and a lock ring coupled to the elongate member. The bearing carrier supports a bearing and is slidably disposed on a portion of the actuator housing. The locking element is operatively connected to the piston assembly and engages the bearing carrier to adjust a total length of the piston assembly as the piston assembly moves from the second position towards the first position to compensate for wear of the clutch assembly.

5 Claims, 18 Drawing Sheets

Related U.S. Application Data on Nov. 11, 2016, provisional application No. 62/453,730, filed on Feb. 2, 2017.

(56) References Cited

U.S. PATENT DOCUMENTS

| | | | |
|---|---|---|---|
| 3,545,578 A * | 12/1970 | Belart | F16D 65/22 |
| | | | 188/196 BA |
| 3,592,299 A | 7/1971 | Erdmann | |
| 3,645,364 A | 2/1972 | Otto et al. | |
| 3,669,233 A | 6/1972 | Kraus et al. | |
| 3,797,613 A | 3/1974 | Nehr | |
| 3,811,540 A | 5/1974 | Knapp et al. | |
| 3,815,471 A * | 6/1974 | Kobelt | F15B 15/1447 |
| | | | 91/189 R |
| 3,822,003 A | 7/1974 | Prange et al. | |
| 3,869,025 A | 3/1975 | Oliver | |
| 3,942,617 A * | 3/1976 | Poon | F16D 25/085 |
| | | | 192/70.252 |
| 4,167,989 A | 9/1979 | Meyer | |
| 4,227,364 A | 10/1980 | Scherbring | |
| 4,742,897 A | 5/1988 | Hiroshi et al. | |
| 4,792,021 A | 12/1988 | Fukuzawa et al. | |
| 5,267,637 A | 12/1993 | Wilbur et al. | |
| 5,435,419 A | 7/1995 | Muzzy | |
| 5,992,378 A | 11/1999 | Parkinson | |
| 6,029,787 A | 2/2000 | Reik et al. | |
| 6,161,791 A | 12/2000 | Gentry, Jr. | |
| 6,325,192 B1 | 12/2001 | Reik et al. | |
| 8,813,937 B2 * | 8/2014 | Hemphill | F16D 25/126 |
| | | | 192/85.62 |
| 2002/0038749 A1 | 4/2002 | Reik et al. | |
| 2002/0096416 A1 | 7/2002 | Otto | |
| 2008/0105503 A1 | 5/2008 | Pribonic | |
| 2010/0229716 A1 | 9/2010 | Govan | |
| 2015/0226274 A1 | 8/2015 | Pritchard | |

FOREIGN PATENT DOCUMENTS

| | | |
|---|---|---|
| CN | 204978604 U | 1/2016 |
| DE | 2360959 A1 | 6/1974 |
| DE | 2646631 A1 | 4/1977 |
| DE | 3210922 A1 * | 9/1983 ........... F16D 25/126 |
| DE | 4202595 A1 | 8/1993 |
| DE | 10330165 A1 | 1/2005 |
| DE | 102006017711 A1 | 10/2007 |
| DE | 102010051449 A1 | 6/2011 |
| EP | 0050945 A1 | 5/1982 |
| EP | 0105977 A1 | 4/1984 |
| EP | 0395506 A1 | 10/1990 |
| EP | 0561506 A1 | 9/1993 |
| EP | 0887254 A2 | 12/1998 |
| EP | 0905398 A1 | 3/1999 |
| EP | 1568905 A1 | 8/2005 |
| EP | 1647731 A2 | 4/2006 |
| EP | 1677020 A1 | 7/2006 |
| EP | 2363614 A1 | 9/2011 |
| EP | 2883736 A1 | 6/2015 |
| GB | 1118833 A | 7/1968 |
| GB | 1131907 A | 10/1968 |
| GB | 1336979 A | 11/1973 |
| GB | 1342002 A | 12/1973 |
| GB | 1478920 A | 7/1977 |
| GB | 2116283 A | 9/1983 |
| JP | 2011247326 A | 12/2011 |
| WO | 9742426 A1 | 11/1997 |
| WO | 2010059423 A1 | 5/2010 |
| WO | 2010068350 A1 | 6/2010 |
| WO | 2010113018 A1 | 10/2010 |

OTHER PUBLICATIONS

Machine translation of DE3210922A1, retrieved from www.espacenet.com (Year: 2020).*

Definition of "operative", retrieved from www.merriam-webster.com (Year: 2020).*

Defintion of "directly", retrieved from www.merriam-webster.com (Year: 2020).*

International Search Report for PCT Application No. PCT/IB2017/000582 dated Feb. 16, 2018, 9 pages.

ISR/WO, dated Feb. 16, 2018, KBA0006PCT.

Written Opinion for PCT Application No. PCT/IB2017/000582 dated Feb. 16, 2018, 10 pages.

* cited by examiner

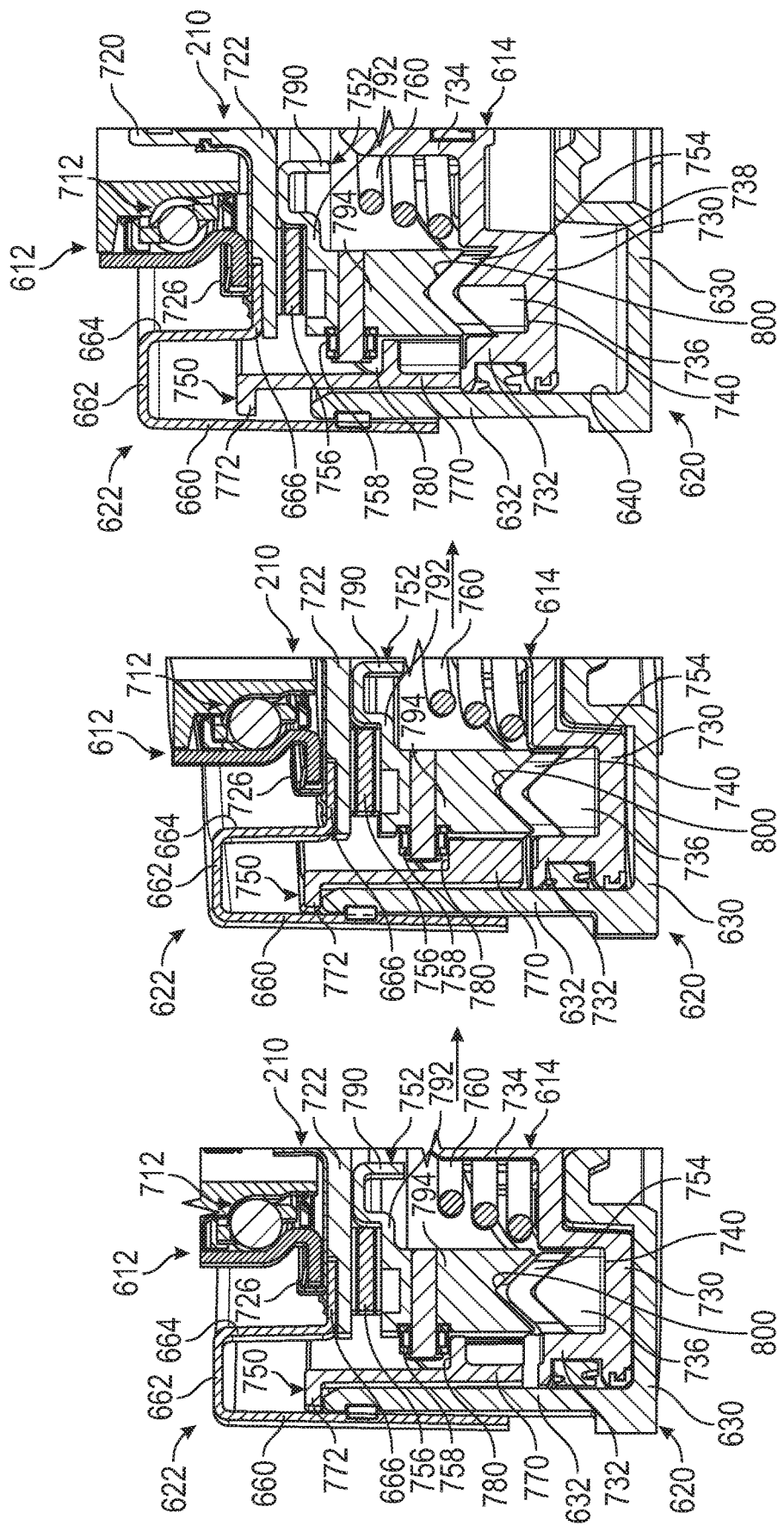

PNEUMATIC CLUTCH ACTUATOR

CROSS-REFERENCE TO RELATED APPLICATIONS

This application claims the benefit of PCT/US2017/30814 filed May 3, 2017, which claims priority to U.S. Provisional Application No. 62/331,656 filed May 4, 2016, U.S. Provisional Application No. 62/420,802 filed Nov. 11, 2016, and U.S. Provisional Application No. 62/453,730 filed Feb. 2, 2017, each of which is incorporated herein by reference in its entirety.

TECHNICAL FIELD

The present disclosure relates to an automatically adjustable pneumatic clutch actuator.

BACKGROUND ART

Motor vehicles are commonly provided with a clutch actuator that is connected to a clutch assembly. The clutch assembly is configured to selectively separate frictionally coupled elements and to transfer energy from a power source, such as an engine output shaft, to a transmission input shaft. The clutch assembly is configured to move between an engaged state and a disengaged state. The clutch assembly includes a clutch disc having a friction surface. The clutch disc friction surface engages a flywheel that is operatively connected to the engine output shaft. The engine output shaft is operatively coupled to the transmission input shaft while the clutch assembly is in the engaged state. The clutch disc friction surface may be disengaged from the flywheel such that the engine output shaft is operatively decoupled from the transmission input shaft.

The selective engagement and disengagement of the clutch assembly may be accomplished by a clutch actuator. The clutch actuator moves the clutch disc friction surface between engagement and disengagement with the flywheel. Over time, the clutch disc friction surface wears and becomes thinner leading to an increased distance of travel for the clutch disc friction surface to the flywheel.

Accordingly, it is desirable to provide a self-adjustment mechanism to automatically compensate for the wear of the clutch disc friction surface during operation. Self-adjustment mechanisms have been previously disclosed in U.S. Pat. Nos. 4,742,897, 3,811,540, 3,592,299, E.P. Patent No. 0050945, W.O. Patent Application 201068350, E.P. Patent No. 2359020, U.S. Patent No. 2015/0226274, G.B. Patent No. 1342002, U.S. Pat. No. 4,167,989, E.P. Patent No. 105977, W.O. Patent Application 2010113018, E.P. Patent No. 905398, E.P. Patent No. 1647731, U.S. Pat. No. 3,482,662, E.P. Patent No. 1568905, U.S. Patent No. 2002/0038749, U.S. Pat. Nos. 6,325,192, 6,029,787, and D.E. Patent No. 4202595.

SUMMARY

According to an exemplary embodiment of the present disclosure, a pneumatic clutch actuator provided with a clutch assembly is provided. The pneumatic clutch actuator includes an actuator housing, a piston assembly, a bearing carrier, and a locking element. The piston assembly is disposed within the actuator housing and is movable between a first position and a second position. The piston assembly is configured to selectively change a clutch state between an engaged state and a disengaged state. The piston assembly has a piston head, an elongate member extending from the piston head, and a lock ring coupled to the elongate member. The bearing carrier supports a bearing and is slidably disposed on a portion of the actuator housing. The locking element is operatively connected to the piston assembly and engages the bearing carrier to adjust a total length of the piston assembly as the piston assembly moves from the second position towards the first position to compensate for wear of the clutch assembly.

According to another exemplary embodiment of the present disclosure, a pneumatic clutch actuator is provided. The pneumatic clutch actuator includes a housing assembly, a bearing assembly, a piston assembly, and an adjustment assembly. The housing assembly is provided with a first housing member and a second housing member. The first housing member has an inner annulus disposed about a transmission input shaft and is at least partially received within the second housing member. The bearing assembly is at least partially received within the housing assembly and is disposed about the inner annulus. The bearing assembly has a bearing carrier that supports a bearing. The piston assembly has a piston head and an extension extending from the piston head towards the bearing assembly. The adjustment assembly is disposed between and is operatively connected to the bearing carrier and the piston head. The adjustment assembly is arranged to adjust a distance between the piston assembly and the bearing assembly as the piston assembly moves between a first position and a second position to compensate for wear of a clutch assembly.

According to yet another exemplary embodiment of the present disclosure, a pneumatic clutch actuator is provided. The pneumatic clutch actuator includes a housing disposed about a shaft, a cover, a bearing assembly, a piston assembly, and an adjustment assembly. The cover is disposed about the shaft and the housing and is movable relative to the housing. The bearing assembly is disposed on the cover and is arranged to selectively engage a clutch assembly. The piston assembly is disposed within the housing and is movable between a first position and a second position to selectively change a state of the clutch assembly between an engaged state and a disengaged state. The adjustment assembly is disposed between the cover and the piston. The adjustment assembly is arranged to adjust a distance between the piston and the bearing assembly to compensate for wear of the clutch assembly.

According to still yet another exemplary embodiment of the present disclosure, a pneumatic clutch actuator is provided. The pneumatic clutch actuator includes a housing assembly, a bearing assembly, a piston assembly, and an adjustment assembly. The housing assembly has a first housing member and a second housing member that at least partially receives the first housing member. The first housing member is provided with an inner annulus that is disposed about a transmission input shaft. The bearing assembly is disposed on a portion of the housing assembly and has a bearing carrier that supports a bearing. The piston assembly is slidably disposed within the housing assembly and is movable between a first position and a second position to selectively change a clutch assembly between an engaged state and a disengaged state. The adjustment assembly is disposed between the bearing assembly and the piston assembly. The adjustment assembly is configured to adjust a total length of the piston assembly to compensate for wear of the clutch assembly.

The above features and advantages and other features and advantages of the present disclosure are readily apparent from the following detailed description of the present disclosure when taken in connection with the accompanying drawings.

BRIEF DESCRIPTION OF DRAWINGS

Other features, advantages and details appear, by way of example only, in the following detailed description of embodiments, the detailed description referring to the drawings in which:

FIGS. 17A-17C are partial sectional views of the pneumatic clutch actuator of FIG. 13 while the clutch assembly moves from an engaged state towards a disengaged state.

DESCRIPTION OF EMBODIMENTS

Figure 1A:
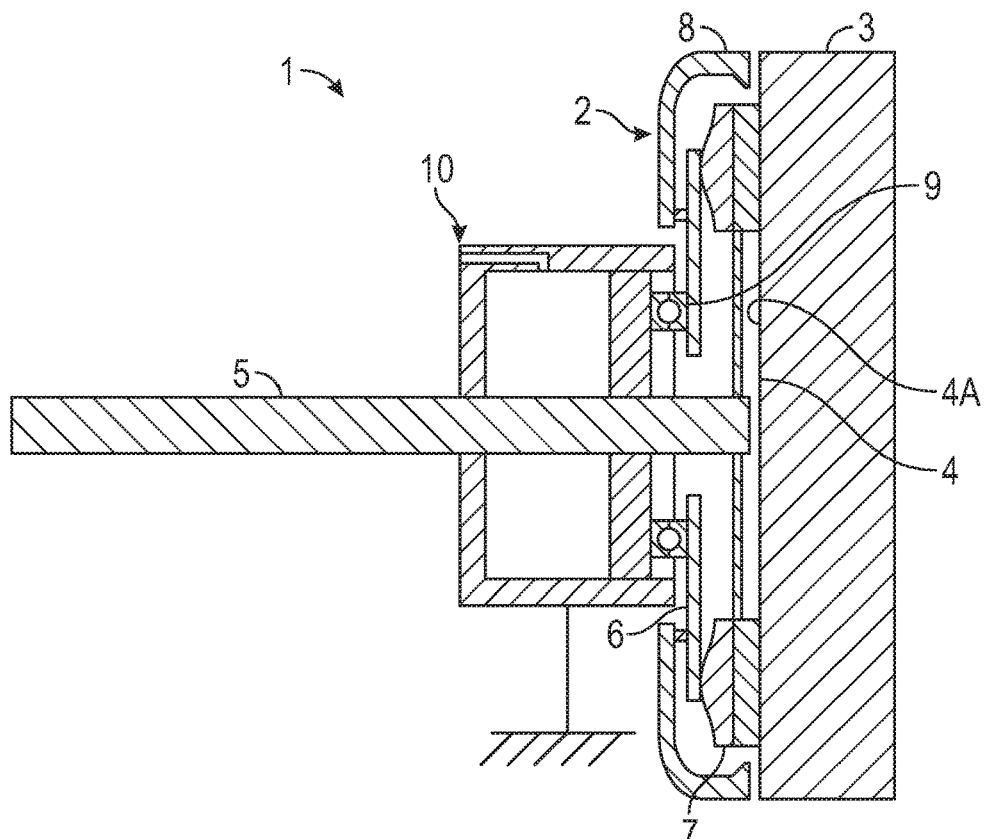
FIG. 1A is a partial cross-sectional view of a clutch assembly having a pneumatic clutch actuator in an engaged state while a piston assembly is in a first position.

The following description is merely exemplary in nature and is not intended to limit the present disclosure, its application or uses. It should be understood that throughout the drawings, corresponding reference numerals indicate like or corresponding parts and features.

Figure 1B:
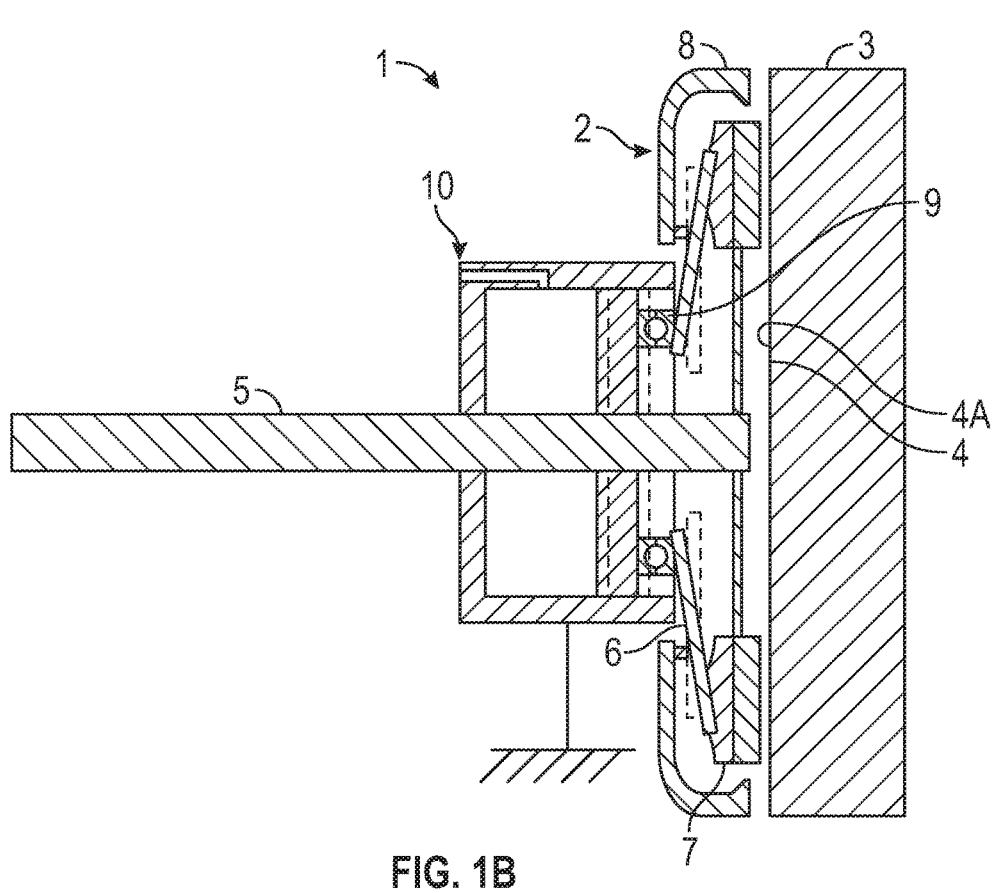
FIG. 1B is a partial cross-sectional view of the clutch assembly having the pneumatic clutch actuator in a disengaged state while the piston assembly is in a second position.

Referring to FIGS. 1A and 1B, vehicles are commonly provided with a clutch assembly 1 to selectively couple rotating components to transmit torque to another rotatable component. The clutch assembly 1 includes a clutch 2 that selectively engages a flywheel 3 to selectively couple and decouple the rotating components. The clutch 2 includes a clutch disc 4 that rotates with the transmission input shaft 5 and is configured to slide axially along the transmission input shaft 5. A friction surface 4A of the clutch disc 4 is pressed by a diaphragm spring 6 through a pressure plate 7 against a face of the flywheel 3.

The diaphragm spring 6 is pivotally mounted to a clutch cover 8 that receives the clutch 2, the diaphragm spring 6, the pressure plate 7, as well as other components. The diaphragm spring 6 is arranged such that an axial force that is provided via a thrust bearing 9 moves the pressure plate 7 towards the clutch disc 4 to engage the friction surface 4A. The diaphragm spring 6 is arranged such that an axial force that is applied via a pneumatic clutch actuator 10 as the pneumatic clutch actuator 10 moves from a first position towards a second position. As the pneumatic clutch actuator moves towards the second position to disengage the clutch assembly 1, as shown in FIG. 1B.

Figure 2:
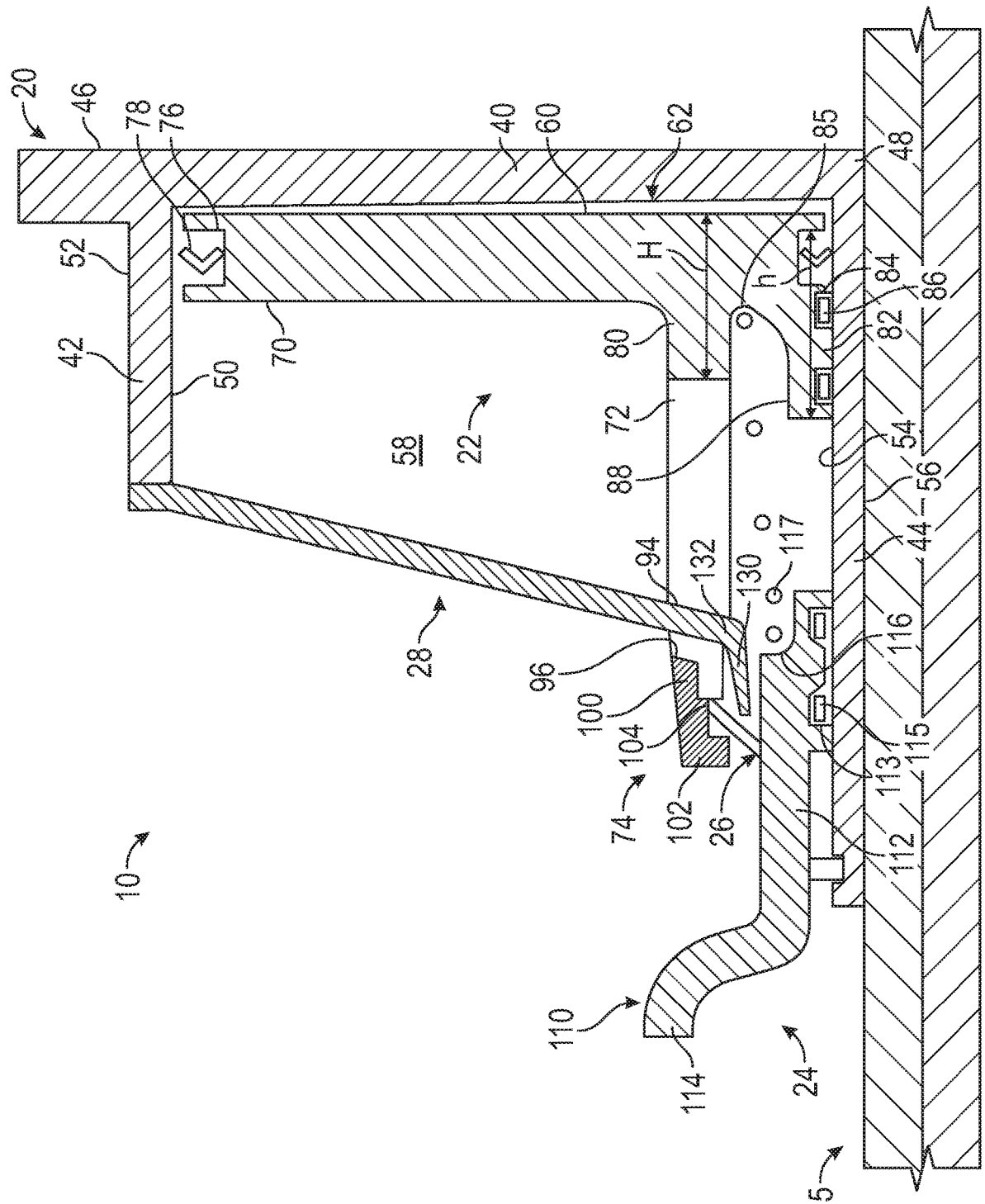
FIG. 2 is a partial cross-sectional view of a first embodiment of a pneumatic clutch actuator.
Figure 3:
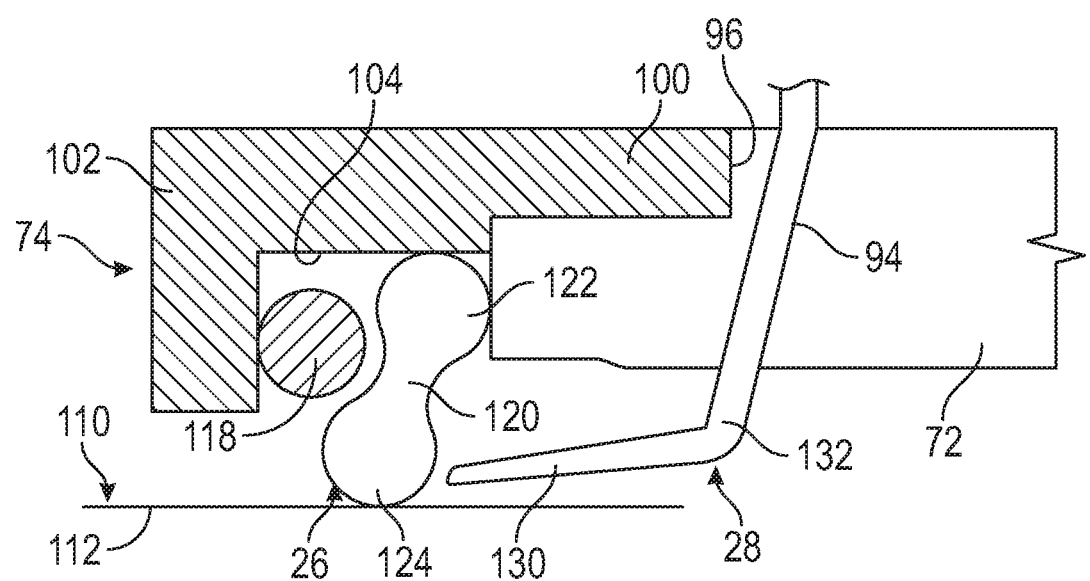
FIG. 3 is a partial cross-sectional view of a portion of the pneumatic clutch actuator of FIG. 2.
Figure 4:
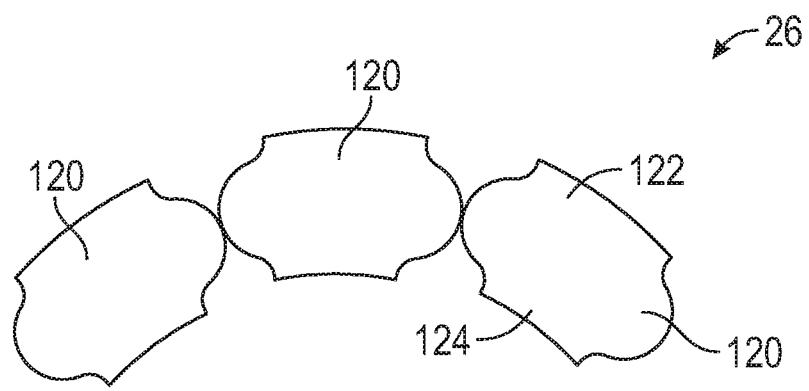
FIG. 4 is a partial perspective view of a portion of a locking element of the pneumatic clutch actuator of FIG. 2.
Figure 10:
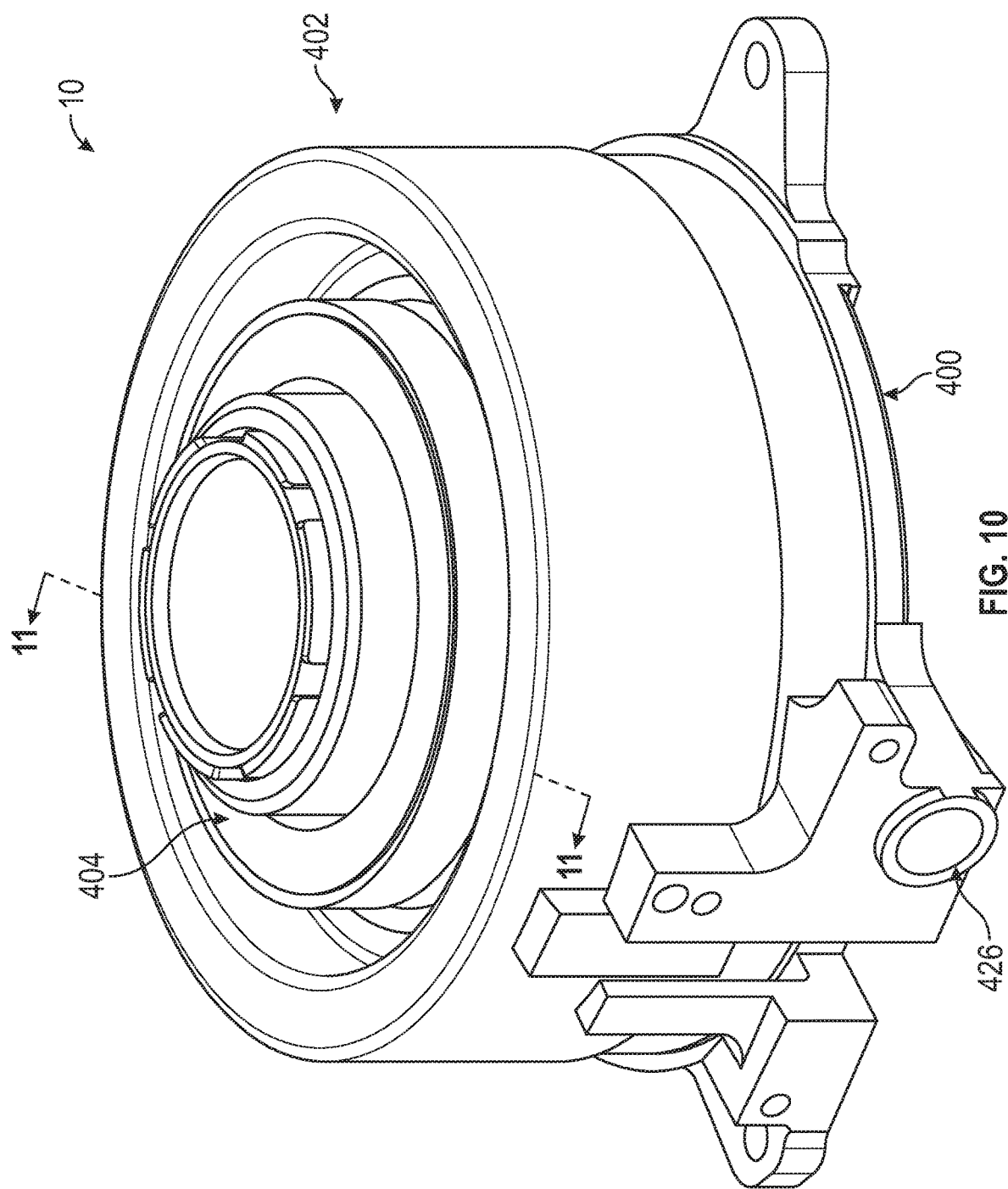
FIG. 10 is a perspective view of a third embodiment of a pneumatic clutch actuator.
Figure 11:
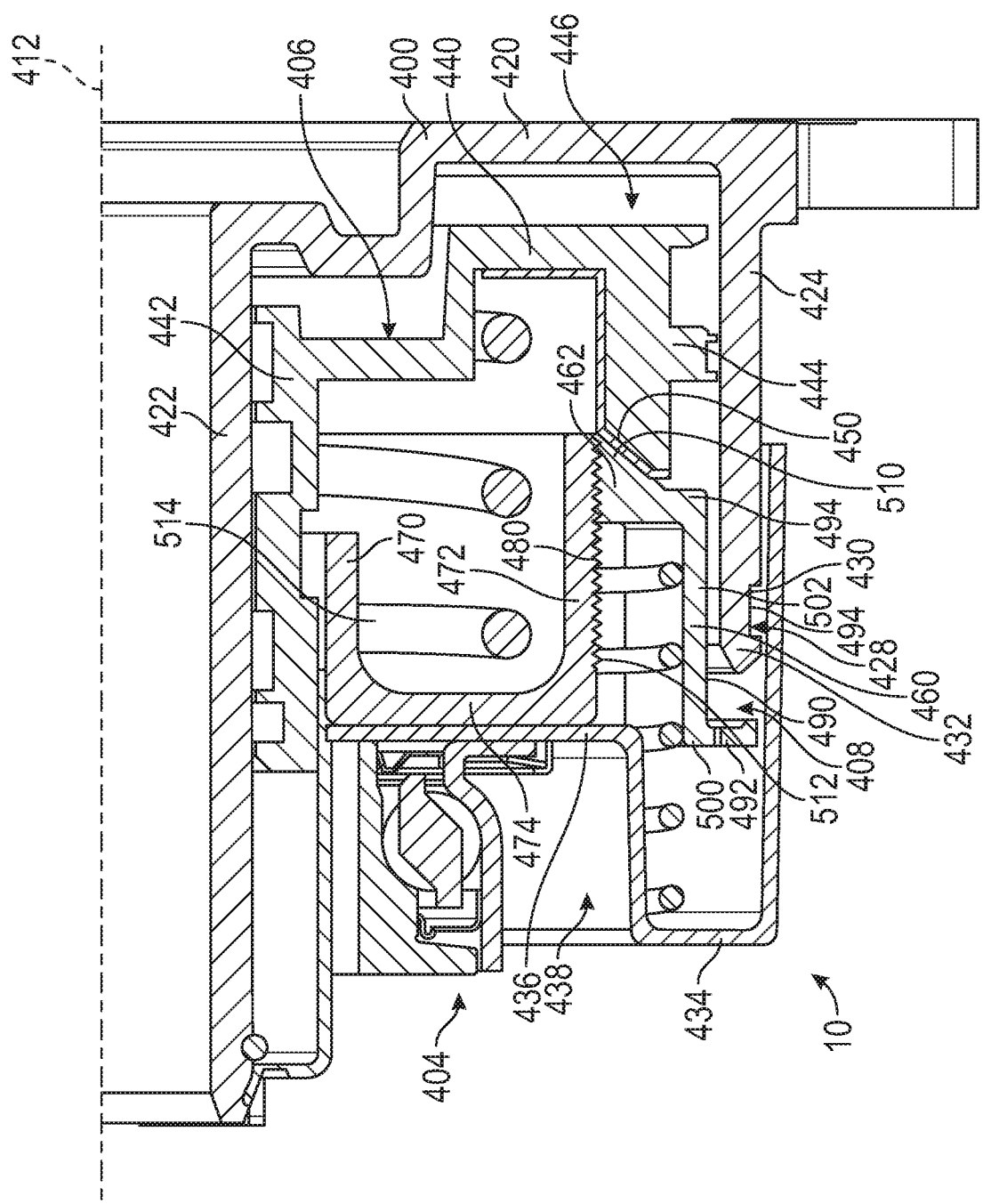
FIG. 11 is a partial cross-sectional view of the pneumatic clutch actuator of FIG. 10 in a pressurized state.
Figure 12:
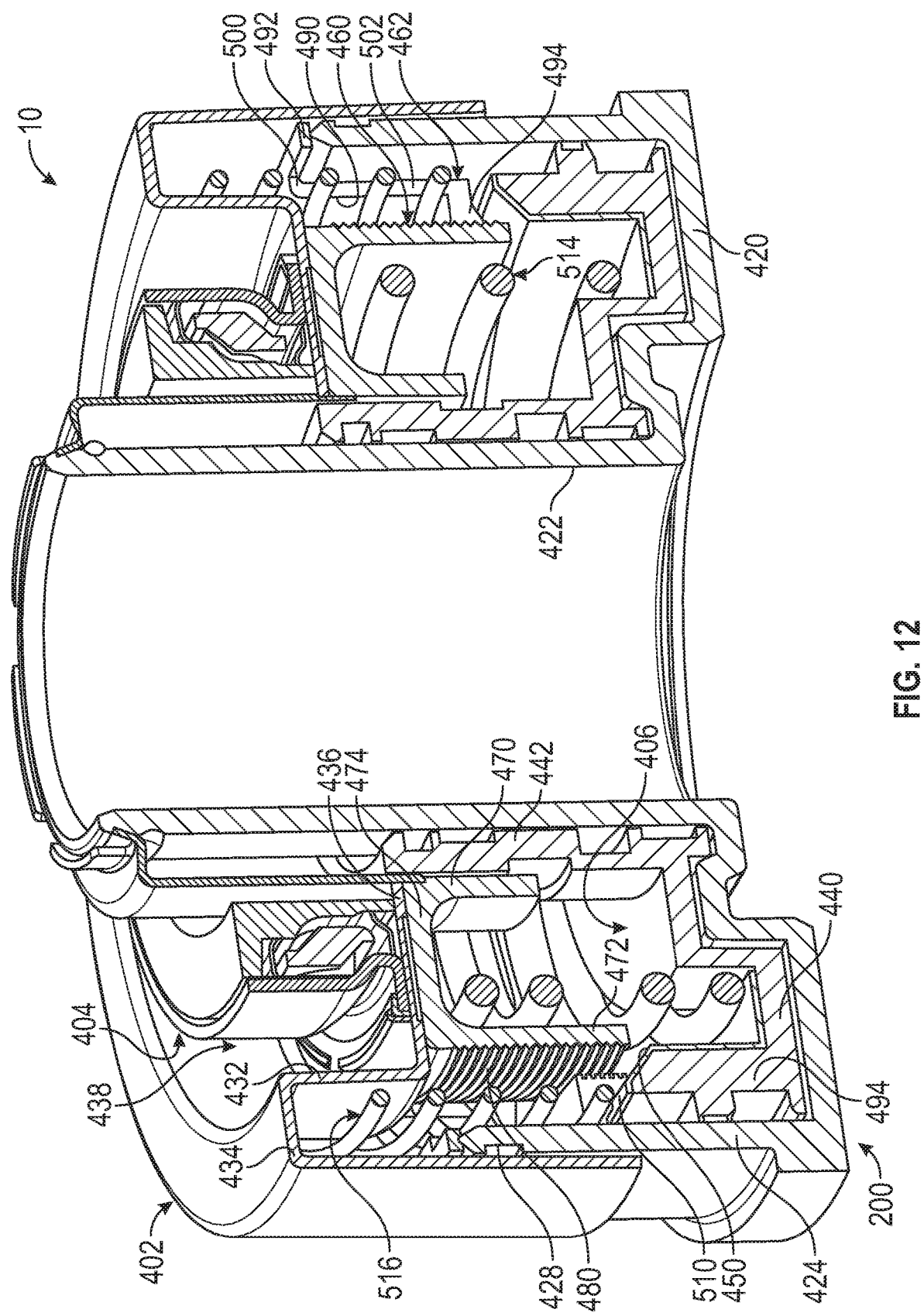
FIG. 12 is a cross-sectional view of the pneumatic clutch actuator of FIG. 10 in a non-pressurized state.
Figure 13:
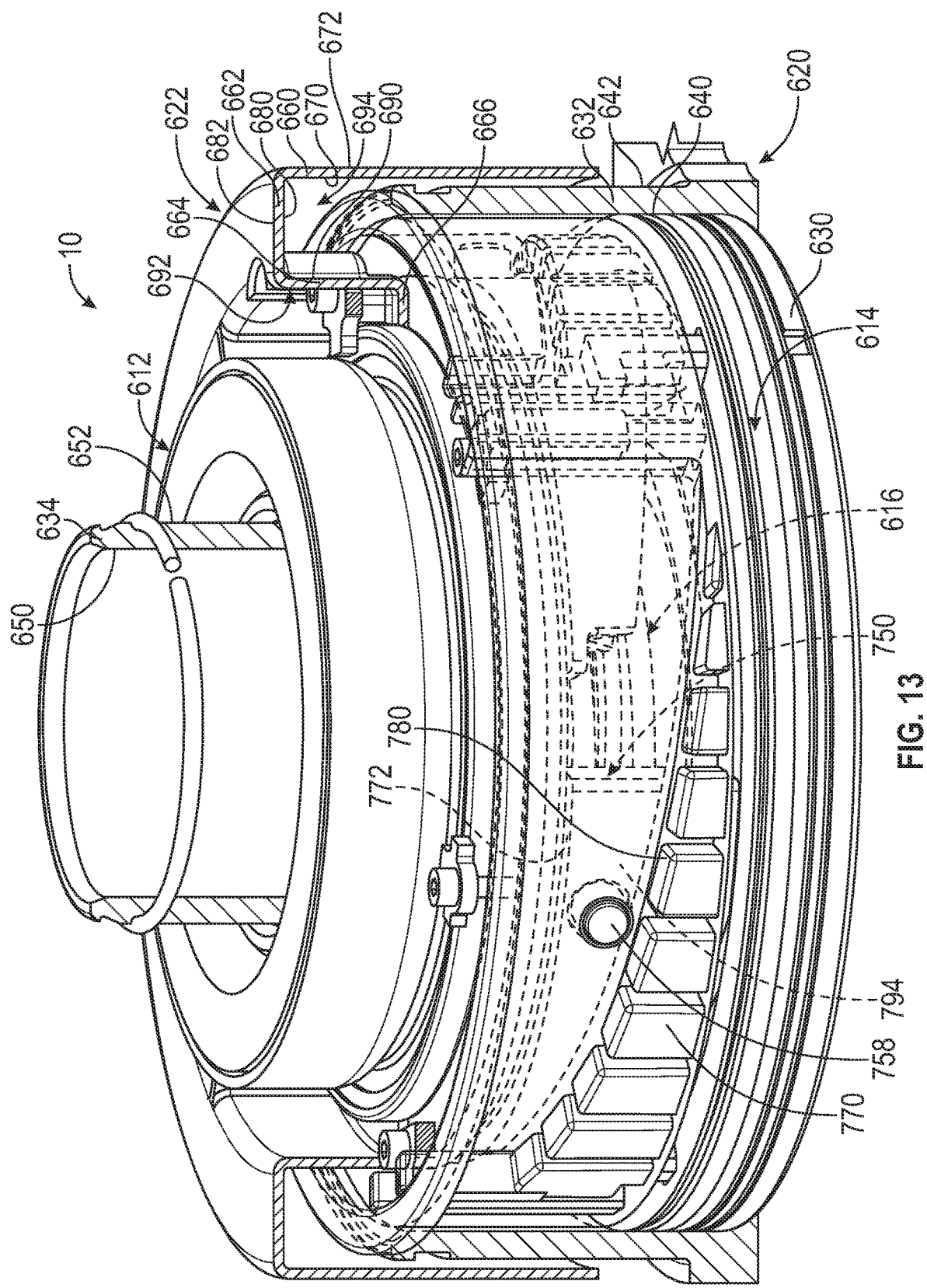
FIG. 13 is a partial cross-sectional view of a fourth embodiment of a pneumatic clutch actuator.

A first exemplary embodiment of a pneumatic clutch actuator 10 is illustrated in FIGS. 2-4. A second exemplary embodiment of the pneumatic clutch actuator 10 is illustrated in FIGS. 5-9. A third exemplary embodiment of a pneumatic clutch actuator 10 is illustrated in FIGS. 10-12. A fourth exemplary embodiment of a pneumatic clutch actuator 10 is illustrated in FIGS. 13-18.

A partial cross-sectional view of the pneumatic clutch actuator 10 is shown in FIG. 2. The pneumatic clutch actuator 10 is configured to selectively change the state of the clutch assembly 1 between an engaged state and a disengaged state.

The pneumatic clutch actuator 10 includes an actuator housing 20, a piston assembly 22, a bearing assembly 24, a locking element 26, and a release ring 28.

The actuator housing 20 is disposed about the transmission input shaft 5 (FIGS. 1A and 1B and is configured as an annular housing. The actuator housing 20 includes a floor 40, a first annular wall 42, and a second annular wall 44.

The floor 40 includes a first end 46 that is spaced apart from the transmission input shaft 5 and a second end 48 that is disposed proximate the transmission input shaft 5. The first annular wall 42 extends from the first end 46 of the floor 40 and is disposed substantially perpendicular to the floor 40. The first annular wall 42 is disposed substantially parallel to the transmission input shaft 5 and includes a first annular wall inner surface 50 and a first annular wall outer surface 52.

The second annular wall 44 is spaced apart from the first annular wall 42. The second annular wall 44 extends from the second end 48 of the floor 40 and is disposed substantially perpendicular to the floor 40. The second annular wall 44 is disposed substantially parallel to the transmission input shaft 5 and includes a second annular wall inner surface 54 and a second annular wall outer surface 56. The second annular wall outer surface 56 defines a bore within which the transmission input shaft 5 is received.

The floor 40, the first annular wall inner surface 50, and the second annular wall inner surface 54 define a cavity 58 within which the piston assembly 22 is received. The piston assembly 22 is slidably or movably disposed within the cavity 58. The piston assembly 22 is configured to selectively change a state of the clutch 2 of the clutch assembly 1 between the engaged state and the disengaged state. The piston assembly 22 is movable between a first position and a second position. The first position may correspond to the engaged state of the clutch 2. The second position may correspond to the disengaged state of the clutch 2.

The piston assembly 22 includes a piston head 70, an elongate member 72, and a lock ring 74. The piston head 70 is configured as a generally cylindrical body and may be disposed adjacent to the floor 40 when the piston assembly 22 is in the first position. Compressed air is provided to the pneumatic clutch actuator 10 to move the piston assembly 22 from the first position (adjacent to the floor 40) towards the second position. A bottom surface 60 of the piston head 70 is spaced apart from the floor 40 when the piston assembly 22 is in the second position. The bottom surface 60 of the piston head 70, the floor 40, the first annular wall 42, and the second annular wall 44 define a volume 62 that receives the compressed air. The evacuation or releasing of the compressed air from the volume 62 enables the piston assembly 22 to move from the second position towards the first position (adjacent to the floor 40 as illustrated in FIG. 2.

The piston head 70 is provided with a circumferential groove 76 that is configured to receive a sealing member 78. The sealing member 78 is configured to engage the first annular wall inner surface 50 to prevent or inhibit leakage of the compressed air around the piston head 70.

The piston head 70 defines a mounting member 80 and an extension member 82. The mounting member 80 extends from the piston head 70 towards the release ring 28. The mounting member 80 is disposed substantially parallel to the first annular wall 42, the second annular wall 44, and the transmission input shaft 5. The mounting member 80 has a mounting member height, H, that is measured from a bottom surface 60 of the piston head 70 to a portion of the mounting member 80. The mounting member 80 is spaced apart from the first annular wall inner surface 50 and the second annular wall inner surface 54.

The extension member 82 extends from the piston head 70 and is disposed substantially parallel to the first annular wall 42 and the second annular wall 44. The extension member 82 defines at least one circumferential groove 84 that is configured to receive a sealing member 86 that is configured to engage the second annular wall inner surface 54. The extension member 82 has an extension member height, h, that is measured from the bottom surface 60 of the piston head 70 to an end 88 of the extension member 82. The extension member height, h, is greater than the mounting member height, H.

The extension member 82 is spaced apart from the mounting member 80 to define a first spring seat 85.

The elongate member 72 extends from the piston head 70 and through the release ring 28. Specifically, the elongate member 72 is coupled to the piston head 70 by the mounting member 80, such that the elongate member 72 extends from the mounting member 80. In at least one embodiment, the elongate member 72 is threaded to or joined with the piston head 70. In at least one embodiment, the elongate member 72 is integrally formed with the piston head 70. The elongate member 72 is disposed proximate the second annular wall 44 and is in spaced relationship to the second annular wall inner surface 54.

The elongate member 72 defines at least one slot 94. The at least one slot 94 extends at least partially through the elongate member 72 between the piston head 70 and an end 96 of the elongate member 72.

The locking ring 74 is disposed about the transmission input shaft 5. The lock ring 74 is disposed at the end 96 of the elongate member 72 that is disposed opposite the piston head 70. In at least one embodiment, the lock ring 74 is configured to move relative to the end 96 of the elongate member 72 to change a total length of the piston assembly 22.

The lock ring 74 includes a first lock ring portion 100 and a second lock ring portion 102. The first lock ring portion 100 extends from the end 96 of the elongate member 72. The first lock ring portion 100 is disposed substantially parallel to and in sliding contact with the elongate member 72. The second lock ring portion 102 extends from the first lock ring portion 100 in a substantially perpendicular orientation to the first lock ring portion 100. The second lock ring portion 102 is disposed substantially perpendicular to the elongate member 72 and extends towards the second annular wall 44. The second lock ring portion 102 is spaced apart from the second annular wall inner surface 54.

The elongate member 72 and the lock ring 74 define a groove 104 that is defined by the second lock ring portion 102 and the end 96 of the elongate member 72.

The bearing assembly 24 includes a bearing carrier 110 that supports the bearing 9. The bearing carrier 110 is disposed about the transmission input shaft 5. The bearing carrier 110 is slidably disposed about the second annular wall inner surface 54. The bearing carrier 110 is configured to slide along the second annular wall inner surface 54 in response to movement of the piston assembly 22 between the first position and the second position.

The bearing carrier 110 includes a first bearing carrier portion 112 and a second bearing carrier portion 114. The first bearing carrier portion 112 is disposed between the second annular wall 44 and the elongate member 72 of the piston assembly 22. The first bearing carrier portion 112 is disposed substantially parallel to the second annular wall 44 and the elongate member 72 of the piston assembly 22. The first bearing carrier portion 112 includes at least one circumferential groove 113 that is configured to receive a sealing member 115. The sealing member 115 is configured to engage the second annular wall inner surface 54 to prevent or inhibit leakage of compressed air.

The first bearing carrier portion 112 defines a second spring seat 116 that is opposed to the first spring seat 85. A spring or biasing member 117 extends between the first spring seat 85 and the second spring seat 116 and applies a preload to at least one of the piston assembly 22 and the bearing carrier 110.

The second bearing carrier portion 114 is configured as a curvilinear member that extends from the first bearing carrier portion 112 away from the second annular wall 44 towards the elongate member 72 of the piston assembly 22.

A portion of the clutch 2 of the clutch assembly 1, such as the diaphragm spring 6, is configured to engage the bearing 9. The diaphragm spring 6 operates to engage and/or disengage the clutch 2 in response to operation of the pneumatic clutch actuator 10 through the movement of the piston assembly 22 between the first position and the second position. The clutch disc 4 of the clutch 2 includes a friction surface that may wear during operation of the pneumatic clutch actuator 10. As the friction surface of the clutch disc 4 of the clutch 2 wears, the piston assembly 22 may travel a greater distance to move between the first position and the second position. For example, when the piston assembly 22 moves from the second position towards the first position, the piston head 70 of the piston assembly 22 may be spaced apart from the floor 40 when in the first position due to the wearing of the friction surface of the clutch disc 4 of the clutch 2.

The spacing apart of the piston head 70 of the piston assembly 22 from the floor when in the first position presents a dead volume within the volume 62 that receives the compressed air and is defined between the bottom surface of the piston head 70, the floor 40, the first annular wall 42, and the second annular wall 44. The dead volume within the volume 62 may cause a pneumatic system to supply additional compressed air to move the piston assembly 22 from the first position towards the second position resulting in a decreased system response time and a decreased system performance. In an attempt to overcome these disadvantages, the locking element 26 and the release ring 28 are provided as part of an adjustment mechanism to adjust a total length of the piston assembly 22 to compensate for wear of the friction surface of the clutch disc 4 of the clutch 2 to minimize the dead volume.

Referring to FIGS. 2 and 3, the locking element 26 is configured as a toothed ring that is disposed between the piston assembly 22 and the bearing carrier 110 of the bearing assembly 24. The locking element 26 extends between the locking ring 74 and the bearing carrier 110 and is secured between by a retaining element 118, such as an O-ring.

The locking element 26 includes a locking element body 120 having a first locking element end 122 and a second locking element end 124. The locking element 26 comprises a ring made of individual bodies each having inner and outer ends. The locking element 26 includes a plurality of locking element bodies and portions of the locking element body 120 are curved and touch adjacent portions of the of an adjacent locking element body, as shown in FIG. 4.

The first locking element end 122 are each received within the groove 104 that is defined by the second lock ring portion 102, the first lock ring portion 100, and the end 96 of the elongate member 72. The second locking element end 124 slidingly engage the bearing carrier 110. The locking element bodies 120 may be arranged as shaped fingers. The shaped fingers may have an elongate shape, a linear shape, a kidney shape, an ovate shape, a reniform shape, a dual reniform shape, an acicular shape, a subulate shape, or the like. For example, as shown in FIG. 3, the first locking element end 122 has a first width, the second locking element end 124 has a second width, a portion of the locking element bodies 120 have a third width that is less than the first width and the second width.

The release ring 28 is connected to the actuator housing 20 and may be configured as a cover of the actuator housing 20. The release ring 28 is connected to the first annular wall 42 of the actuator housing 20 and extends radially inwardly towards the second annular wall 44 of the actuator housing 20. The release ring 28 is spaced apart from the second annular wall 44 of the actuator housing 20 and extends at least partially through the at least one slot 94 of the elongate member 72 of the piston assembly 22.

The release ring 28 includes a raised annulus or collar 130 that extends from an end 132 of the release ring 28 that is disposed proximate the second annular wall 44 of the actuator housing 20. The raised annulus or collar 130 is disposed generally parallel to the transmission input shaft 5 and is disposed generally parallel to the second annular wall 44. The raised annulus or collar 130 is configured to selectively engage the locking element 26 to adjust a total length of the piston assembly 22 in response to movement of the piston assembly 22 relative to the release ring 28.

The raised annulus or collar 130 is configured to engage the second locking element end 124 of the locking element 26 when the piston assembly 22 moves from the second position towards the first position. The raised annulus or collar 130 is configured to engage the second locking element end 124 when the piston assembly 22 is in the first position. The raised annulus or collar 130 pivots or deflects the locking element 26 about a pivot point or deflection point defined by the retaining element 118 to lift the second locking element end 124 off of the first bearing carrier portion 112 to enable the lock ring 74 to move longitudinally relative to the elongate member 72 to adjust a total length of the piston assembly 22 to compensate for wear of the clutch assembly. The raised annulus or collar 130 is configured to be spaced apart from the second locking element end 124 when the piston assembly 22 moves from the first position towards the second position and when the piston assembly 22 is in the second position.

In accordance with a second exemplary embodiment, a pneumatic clutch actuator 10 is illustrated in FIGS. 5-9.

Figure 5:
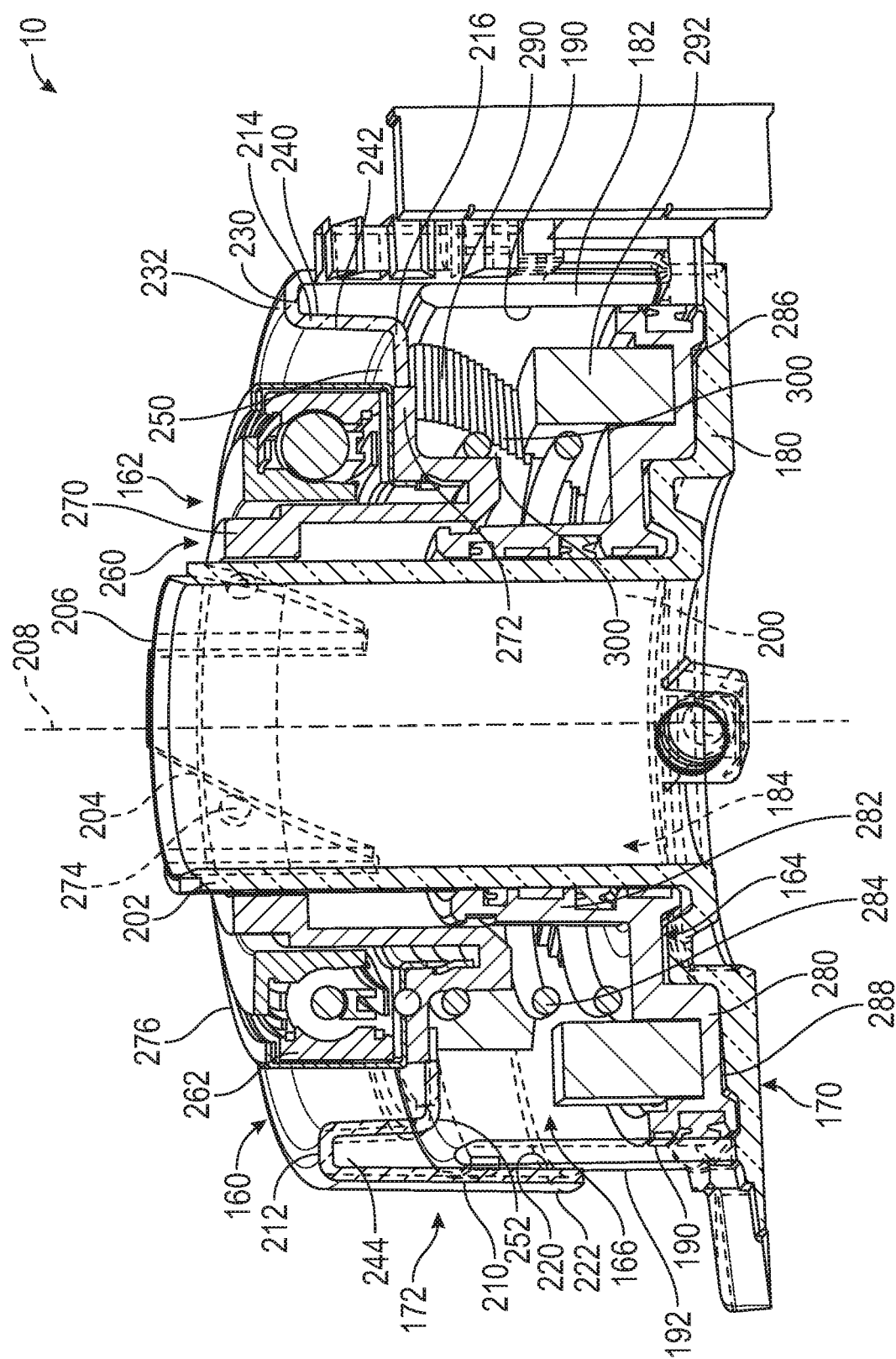
FIG. 5 is a partial cross-sectional view of a second embodiment of a pneumatic clutch actuator having an automatic adjustment mechanism.

A partial cross-sectional view of the pneumatic clutch actuator 10 is shown in FIG. 5. The pneumatic clutch actuator 10 is configured to selectively change the state of the clutch 2 of the clutch assembly 1 that is operatively connected to the pneumatic clutch actuator 10 between an engaged state and a disengaged state (See FIGS. 1A and 1B).

The pneumatic clutch actuator 10 includes a housing assembly 160, a bearing assembly 162, a piston assembly 164, and an adjustment assembly 166.

The housing assembly 160 is circumferentially disposed about the transmission input shaft 5 and is configured as an annular housing. The housing assembly 160 includes a first housing member 170 and a second housing member 172. The first housing member 170 is at least partially received within the second housing member 172.

The first housing member 170 includes a base 180, a first annular wall 182, and an inner annulus 184. The first annular wall 182 extends from the base 180 and is disposed substantially perpendicular thereto. The first annular wall 182 includes an inner surface 190 and an outer surface 192.

The inner annulus 184 may be a hollow post or annulus that extends axially from the base 180 and is spaced apart from the first annular wall 182. The inner annulus 184 extends from the base 180 towards and through the second housing member 172 inner annulus and is disposed substantially concentric with the first annular wall 182 and includes an inner annulus inner surface 200 and an inner annulus outer surface 202. The inner annulus inner surface 200 defines a bore within which the transmission input shaft 5 is received.

The inner annulus 184 defines a ramp 204 that is disposed proximate a terminal end 206 inner annulus thereof. The ramp 204 is angled relative to an axis 208 along which the inner annulus 184 extends and is defined in the inner annulus outer surface 202 and extends towards the inner annulus inner surface 200.

The second housing member 172 includes an outer annular wall 210, an extension wall 212, an inner annular wall 214, and a shoulder 216 extending radially inwardly therefrom. The outer annular wall 210 includes a second annular wall inner surface 220 and a second annular wall outer surface 222. The second annular wall inner surface 220 is disposed proximate to and faces towards the outer surface 192.

The extension wall 212 connects the outer annular wall 210 and the inner annular wall 214. The extension wall 212 is disposed substantially perpendicular to the outer annular wall 210 and is disposed substantially parallel to the base 180. The extension wall 212 includes an extension wall inner surface 230 and an extension wall outer surface 232.

The inner annular wall 214 extends from the extension wall 212 and is disposed substantially perpendicular thereto. The inner annular wall 214 is disposed substantially parallel to the outer annular wall 210 and includes a third annular wall inner surface 240 and a third annular wall outer surface 242. The second annular wall inner surface 220, the extension wall inner surface 230, and the third annular wall inner surface 240 define an annular cavity 244. The annular cavity 244 is sized to at least partially receive the first annular wall 182 of the first housing member 170.

The shoulder 216 extends radially inwardly from the inner annular wall 214 towards the inner annulus 184. The shoulder 216 is disposed substantially perpendicular to the inner annular wall 214 and is disposed substantially parallel to the extension wall 212. The shoulder 216 includes a first shoulder surface 250 and a second shoulder surface 252. The first shoulder surface 250 faces away from the base 180. The second shoulder surface 252 faces towards the base 180.

The bearing assembly 162 is at least partially received within the housing assembly 160 and is disposed about the inner annulus 184. The bearing assembly 162 includes a bearing carrier 260 and a bearing 262.

The bearing carrier 260 is slidably disposed about the inner annulus outer surface 202. The bearing carrier 260 is slidably disposed about the inner annulus outer surface 202. The bearing carrier 260 slides along the inner annulus outer surface 202 in response to movement of the piston assembly 164 or in response to the application of a force or load onto the bearing assembly 162 by the diaphragm spring 6.

The bearing carrier 260 includes a first bearing carrier portion 270 and a second bearing carrier portion 272. The first bearing carrier portion 270 is disposed radially between the inner annulus 184 and the bearing assembly 162 and extends substantially parallel to the inner annulus 184. The first bearing carrier portion 270 includes a protrusion(s) 274 that extends radially inwardly towards the axis 208 of the transmission input shaft 5. The protrusion(s) 274 is configured to engage the ramp 204 and facilitates rotation of the piston assembly 164 relative to at least one of the second housing member 172 and the bearing assembly 162 as the piston assembly 164 moves between the first position and the second position.

The second bearing carrier portion 272 extends radially outwardly from the first bearing carrier portion 270 towards the inner annular wall 214 to define the shoulder 216 to receive the bearing 262.

The bearing 262 is rotatably supported by the second bearing carrier portion 272 of the bearing carrier 260. A member 276 is disposed between the second bearing carrier portion 272 and the bearing 262. The member 276 is at least partially disposed about the bearing 262.

The bearing 262 may be configured as a release bearing or may be configured as the bearing 9. The bearing 262 may include an inner race and an outer race with at least one rolling element disposed between the inner race and the outer race.

The piston assembly 164 is slidably received within the first housing member 170 and is configured to selectively change a clutch state of the clutch 2 that engages the bearing assembly 162 between an engaged state and a disengaged state. The piston assembly 164 is movable between a first position and a second position in response to the application of compressed air provided by a pneumatic source. The first position of the piston assembly 164 may correspond to the engaged state of the clutch 2 of the clutch assembly 1. The second position of the piston assembly 164 may correspond to the disengaged state of the clutch 2 of the clutch assembly 1.

The piston assembly 164 includes a piston head 280 and an (annular extension member) extension member 282. The piston head 280 is disposed adjacent to the base 180 when the piston assembly 164 is in the first position. Compressed air that is provided to the pneumatic clutch actuator 10 moves the piston assembly 164 from the first position towards the second position. A bottom surface 286 of the piston head 280 is spaced apart from the base 180 when the piston assembly 164 is in the second position. The bottom surface of the piston head 280, the base 180, and the inner surface 190 define a volume 288 that receives the compressed air. The evacuation or releasing of the compressed air from the volume 288 enables the piston assembly 164 to move from the second position towards the first position, as shown in FIG. 5.

The extension member 282 extends axially from the piston head 280 towards the bearing assembly 162. At least a portion of the extension member 282 is disposed between the bearing carrier 260 and the inner annulus 184. The extension member 282 is disposed about inner annulus and slidingly engages the inner annulus outer surface 202.

A biasing member 284 extends between the piston head 280 and the bearing carrier 260. The biasing member 284 is configured to engage the piston head 280 and the second bearing carrier portion 272 to apply a preload to at least one of the piston assembly 164 and the bearing assembly 162.

A portion of the clutch assembly 1, such as a diaphragm spring 6, is configured to engage the bearing assembly 162. The diaphragm spring 6 operates to engage and/or disengage the clutch assembly 1 in response to operation of the pneumatic clutch actuator 10 through the movement of the piston assembly 164 between the first position and the second position. The clutch disc 4 has a friction surface that may wear during operation of the clutch assembly 1. As the friction surface of the clutch disc 4 of the clutch 2 wears, the piston assembly 164 may travel a greater distance to move between the first position and the second position.

For example, when the piston assembly 164 moves from the second position towards the first position, the piston head 280 of the piston assembly 164 may be spaced apart from the base 180 at the end of its travel. The spacing apart of the piston head 280 of the piston assembly 164 from the base 180 when in the first position presents a dead volume between the bottom surface 286 of the piston head 280, the base 180, and the first annular wall 182. The dead volume may require that a pneumatic system supply additional compressed air to move the piston assembly 164 from the first position towards the second position. The dead volume may result in an increased system response time and decreased system performance due to having to supply the compressed air to fill the dead volume prior to causing the piston assembly 164 to move between the first position and the second position. In an attempt to overcome these disadvantages, the adjustment assembly 166 is provided to compensate for the dead volume or to minimize the dead volume in response to wear of the friction surface of the clutch disc of the clutch assembly. The adjustment assembly 166 is configured to provide a compressive force between the piston assembly 164 and the bearing assembly 162 to maintain a predetermined distance or to adjust a distance between the piston assembly 164 and the first housing member 170.

Figure 6:
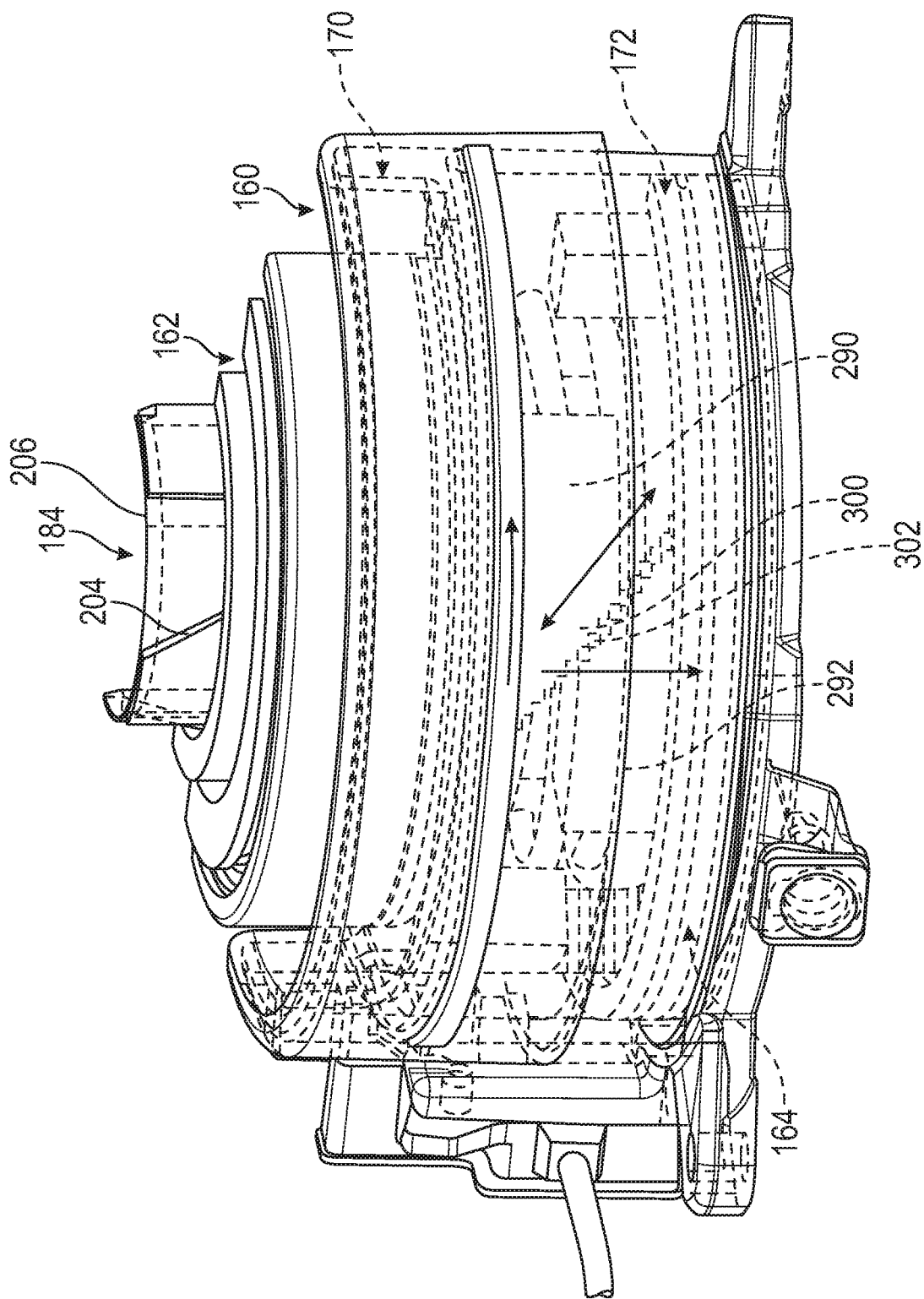
FIG. 6 is a partial cross-sectional view of the pneumatic clutch actuator of FIG. 5 before adjustment.
Figure 9:
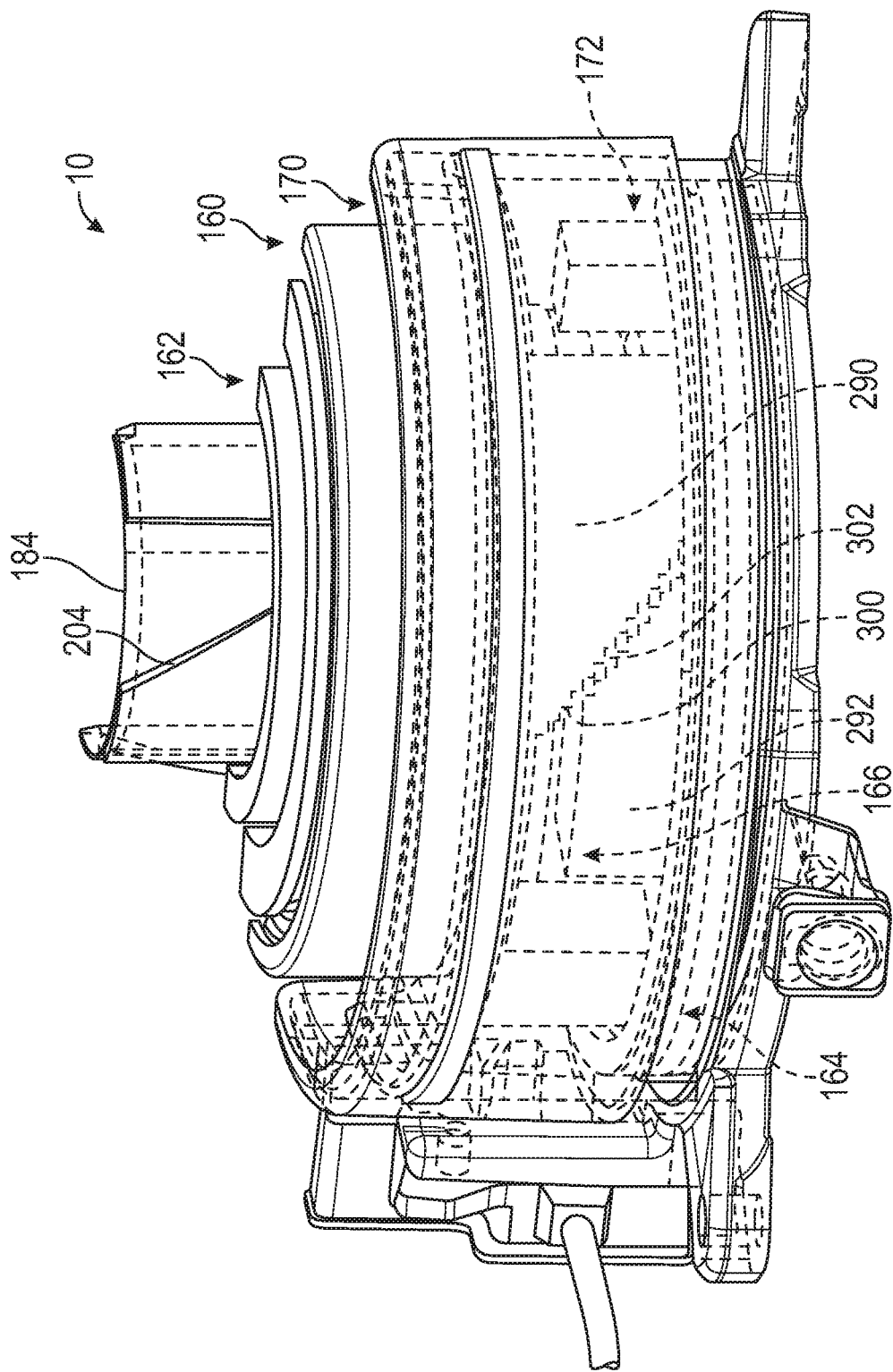
FIG. 9 is a partial cross-sectional view of the pneumatic clutch actuator of FIG. 5 after adjustment and after actuation of the pneumatic clutch actuator.

Referring to FIGS. 5, 6, and 9, the adjustment assembly 166 includes a first adjustment member 290 and a second adjustment member 292. The first adjustment member 290 is disposed about the bearing carrier 260. The first adjustment member 290 is disposed on or abuts the second shoulder surface 252 and the second bearing carrier portion 272.

The first adjustment member 290 includes a plurality of first adjustment members 300. The plurality of first adjustment members 300 face towards the piston head 280 and are configured as an inclined stepped ramp. The plurality of first adjustment members 300 are inclined in a first direction.

The second adjustment member 292 is disposed on or abuts the piston head 280. The second adjustment member 292 is disposed annularly about the extension member 282 and includes a plurality of second adjustment members 302 in an opposing relationship with the plurality of first adjustment members 300. The plurality of second adjustment members 302 face towards the bearing carrier 260 of the bearing assembly 162 and face towards the plurality of first adjustment members 300. The plurality of second adjustment members 302 are configured as an inclined stepped ramp that is complementary to the inclined stepped ramp of the plurality of first adjustment members 300. The plurality of second adjustment members 302 are inclined in a second direction that is disposed opposite the first direction.

The plurality of first adjustment members 300 and the plurality of second adjustment members 302 are each inclined at an angle substantially similar to the angle of the ramp 204. In at least one embodiment, the angle has the same pitch as the ramp 204.

Figure 7:
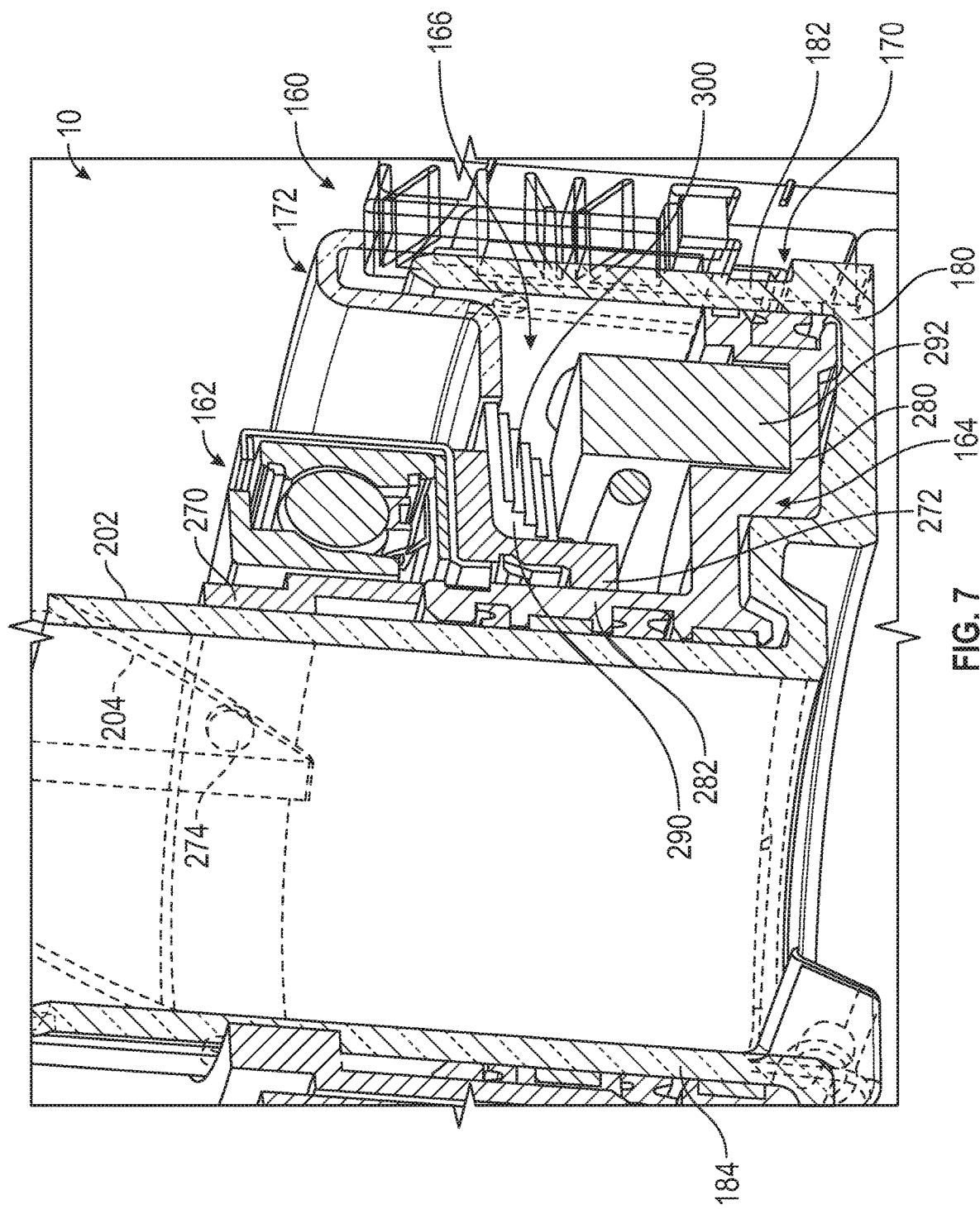
FIG. 7 is a partial cross-sectional view of the pneumatic clutch actuator of FIG. 5 before adjustment

Referring to FIGS. 5 and 7, the relative motion of the protrusion 274 along the ramp 204 rotates the piston assembly 164 relative to the bearing assembly 162. In addition, the relative motion between the protrusion 274 and the ramp 204 rotates the piston assembly 164 relative to the second housing member 172 such that the second adjustment member 292 rotates relative to the first adjustment member 290. The second adjustment member 292 rotates relative to the first adjustment member 290 at least until a member of the plurality of first adjustment members 300 engages a member of the plurality of second adjustment members 302. The relative movement between the plurality of first adjustment members 300 and the plurality of second adjustment members 302 adjusts a distance between the piston assembly 164 and the bearing assembly 162 to compensate for wear of the clutch assembly 1.

Figure 8:
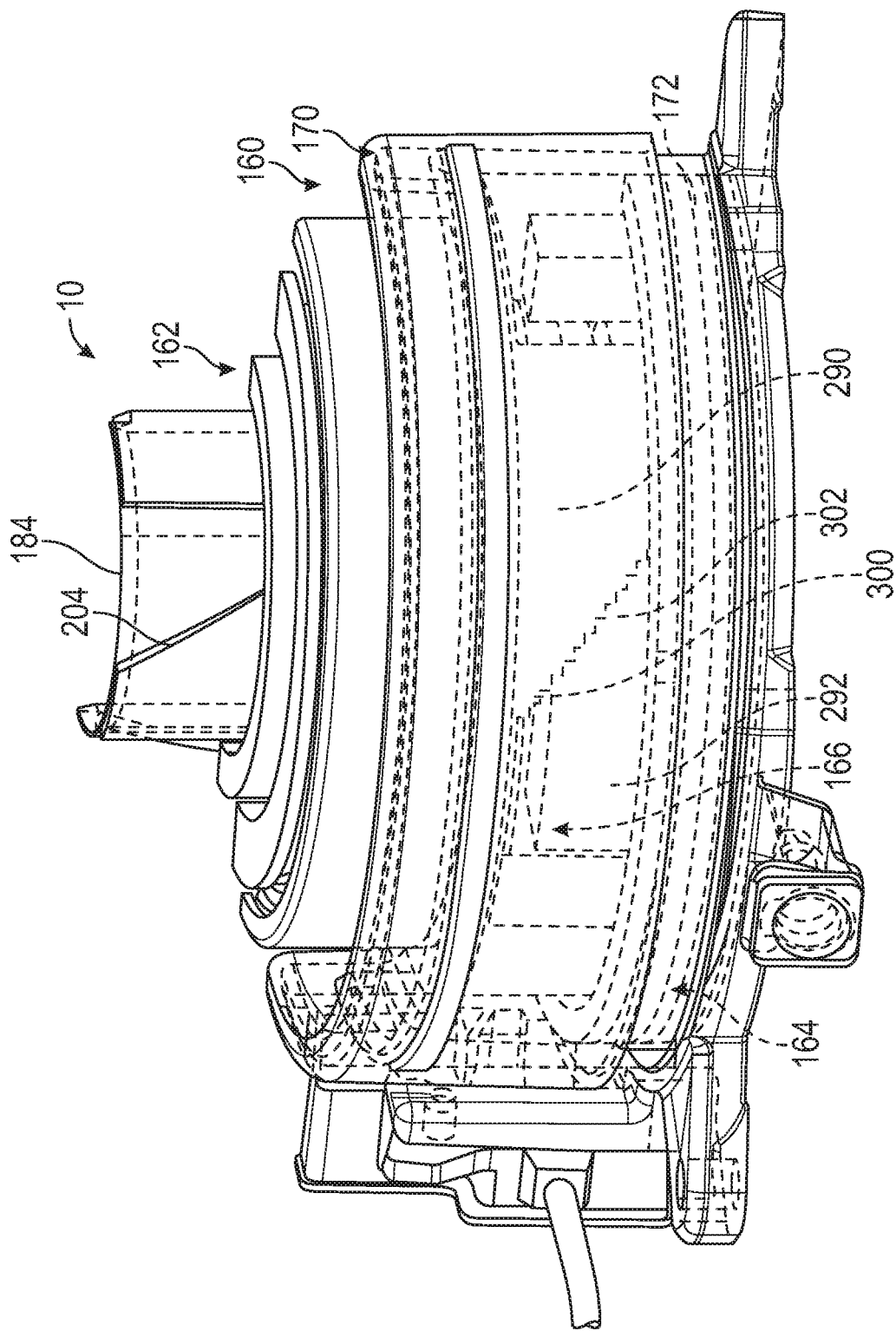
FIG. 8 is a perspective view of the pneumatic clutch actuator of FIG. 5 after adjustment and before actuation of the pneumatic clutch actuator.

Referring to FIGS. 6-9, as compressed air is supplied to the pneumatic clutch actuator 10, the piston assembly 164 moves from the first position towards the second position to disengage the clutch 2. As the piston assembly 164 moves towards the bearing assembly 162 the second adjustment member 292 moves rotates relative to the first adjustment member 290, as shown in FIGS. 6 and 7. The protrusion 274 rides along the ramp 204 and rotates the piston assembly 164 such that the second adjustment member 292 rotates relative to the first adjustment member 290. A member of the plurality of first adjustment members 300 is disposed proximate and may engage a member of the plurality of second adjustment members 302, as shown in FIG. 8.

As shown in FIG. 9, the engagement between the plurality of first adjustment members 300 and the plurality of second adjustment members 302 maintains or adjusts a distance between the piston assembly 164 and the bearing assembly 162 to be within a predetermined distance. A drag torque from the bearing assembly 162 may ensure that an adjustment member of the plurality of the first adjustment members 300 engages an adjustment member of the plurality of the second adjustment members 302 at a highest position such that the dead volume is at a minimum.

In accordance with a third exemplary embodiment, a pneumatic clutch actuator 10 is illustrated in FIGS. 10-12.

The pneumatic clutch actuator 10 is configured to selectively change the state of the clutch assembly 1 between an engaged state and a disengaged state. The pneumatic clutch actuator 10 includes a housing 400, a cover 402, a bearing assembly 404, a piston assembly 406, and an adjustment assembly 408.

The housing 400 is disposed about the transmission input shaft 5 that extends along an axis 412. The housing 400 is configured as an annular housing. The housing 400 includes a floor 420, a first housing wall 422, a second housing wall 424, and an air inlet 426.

The floor 420 is disposed about the transmission input shaft 5 and is disposed substantially perpendicular to the transmission input shaft 5 and the axis 412. The floor 420 radially extends between the first housing wall 422 and the second housing wall 424.

The first housing wall 422 axially extends from the floor 420 and is disposed substantially perpendicular thereto. The first housing wall 422 is disposed proximate and is disposed substantially parallel to the shaft 410.

The second housing wall 424 is radially spaced apart from the first housing wall 422. The second housing wall 424 axially extends from the floor 420 and is disposed substantially perpendicular thereto. The second housing wall 424 is disposed substantially parallel to the shaft 410. The second housing wall 424 defines a notch 428 that is disposed proximate an end thereof.

The air inlet 426 extends through at least a portion of the second housing wall 424. The air inlet 426 is configured to receive compressed air from a pneumatic source and provide the compressed air to an interior portion of the pneumatic clutch actuator 10 to selectively actuate the pneumatic clutch actuator 10.

The cover 402 is disposed about the transmission input shaft 5 and the housing 400. The cover 402 is movable relative to the housing 400. The cover 402 includes a first cover wall 430, a second cover wall 432, an extension wall 434, and a shoulder 436.

The first cover wall 430 is disposed about the second housing wall 424 in a substantially parallel relationship to the second housing wall 424.

The second cover wall 432 is radially spaced apart from the first cover wall 430. The second cover wall 432 is radially disposed between the first cover wall 430 and the first housing wall 422. The extension wall 434 extends between distal ends of the first cover wall 430 and the second cover wall 432. The extension wall 434 is disposed substantially perpendicular to the first cover wall 430 and the second cover wall 432. The extension wall 434 is disposed substantially parallel to the floor 420.

The shoulder 436 extends radially inwardly from the second cover wall 432 towards the axis 412 and the first housing wall 422. The shoulder 436 is disposed substantially perpendicular to the second cover wall 432. The shoulder 436 is configured to receive the bearing assembly 404.

The bearing assembly 404 is received within the pocket 438 and is disposed on the shoulder 436 and is arranged to move or translate with the cover 402 in response to actuation of the pneumatic clutch actuator 10.

A portion of the clutch 2 of the clutch assembly 1, such as the diaphragm spring 6, may engage the bearing assembly 404. The diaphragm spring 6 operates to engage and/or disengage the clutch 2 in response to operation of the pneumatic clutch actuator 10.

The piston assembly 406 is movable between a first position (FIG. 12) and a second position (FIG. 11) to selectively change a state of the clutch assembly 1 in response to the application or release of compressed air provided from the pneumatic source.

The piston assembly 406 includes a piston head 440, an extension member 442, and a piston skirt 444.

The piston head 440 radially extends between the extension member 442 and the piston skirt 444 and is disposed adjacent the floor 420 when the piston assembly 406 is in the first position, as shown in FIG. 12. The provision of compressed air through the air inlet 426 moves the piston assembly 406 from the first position towards the second position.

The piston head 440 is spaced apart from the floor 420 when the piston assembly 406 is in the second position, as shown in FIG. 11. The piston head 440, the floor 420, the first housing wall 422, and the second housing wall 424 at least partially define a volume 446 that receives the compressed air. The evacuation or releasing of the compressed air from the volume 446 enables the piston assembly 406 to move from the second position towards the first position, as shown FIG. 12.

The extension member 442 is disposed about the first housing wall 422. The extension member 442 extends axially from the piston head 440 and is disposed proximate and is disposed substantially parallel to the first housing wall 422. The extension member 442 sealingly engages the first housing wall 422.

The piston skirt 444 is radially spaced apart from the extension member 442. The piston skirt 444 is disposed substantially parallel to and is disposed proximate the second housing wall 424. The piston skirt 444 sealingly engages the second housing wall 424.

The piston skirt 444 defines a first engagement surface 450 that is disposed at an end of the piston skirt 444. The first engagement surface 450 is configured as a conical surface, a chamfered surface, a ramped surface, or the like. The first engagement surface 450 is disposed in a nonparallel and a non-perpendicular relationship with respect to the piston skirt 444 and or the piston head 440.

As the friction surface of the clutch disc 4 of the clutch 2 wears, the piston assembly 406 may, without adjustment, travel a greater distance to move between the first position and the second position. For example, when the piston assembly 406 moves from the second position towards the first position, the piston head 440 of the piston assembly 406 may be spaced apart from the floor 420 even when the compressed air is substantially evacuated from the volume 446 due to the wearing of the friction surface of the clutch disc 4 of the clutch 2. The spacing apart of the piston head 440 from the floor 420 while the piston assembly 406 is in the first position presents a dead volume within the volume 446. The dead volume may result in an increased clutch assembly 1 system response time and decreased system performance. In an attempt to overcome these disadvantages, the adjustment assembly 408 adjusts a distance between the piston assembly 406 and the bearing assembly 404 to eliminate the dead volume.

The adjustment assembly 408 is disposed between the cover 402 and the piston assembly 406 and is disposed about a portion of the piston assembly 406. The adjustment assembly 408 is configured to, or is arranged to; adjust a distance between the piston assembly 406 and the bearing assembly 404 to maintain consistent performance of the pneumatic clutch actuator 10. The adjustment assembly 408 includes a sleeve adjuster 460 and a conical adjuster 462.

The sleeve adjuster 460 is radially disposed between the extension member 442 and the conical adjuster 462. The sleeve adjuster 460 is axially disposed between the shoulder 436 of the cover 402 and the piston head 440 of the piston assembly 406. The sleeve adjuster 460 includes a first portion 470, a second portion 472, and a third portion 474. The first portion 470 is disposed proximate and annularly encompasses the extension member 442 of the piston assembly 406.

The second portion 472 is radially spaced apart from the first portion 470 and is disposed substantially parallel thereto. The second portion 472 is arranged to selectively engage the conical adjuster 462 through a plurality of first engagement elements 480 defined by the second portion 472. The plurality of first engagement elements 480 are disposed on a surface of the second portion 472 that face outwardly towards the second housing wall 424. The plurality of first engagement elements 480 are configured as teeth, protrusions, fingers, threads, or the like.

The third portion 474 radially extends between the first portion 470 and the second portion 472. The third portion 474 is disposed substantially perpendicular to the first portion 470 and the second portion 472. The third portion 474 is configured to engage the shoulder 436 of the cover 402.

The conical adjuster 462 is disposed about the sleeve adjuster 460 and is radially disposed between the second housing wall 424 and the sleeve adjuster 460. The conical adjuster 462 is axially disposed between the cover 402 and the piston assembly 406. The conical adjuster 462 includes an adjuster wall 490, a lip 492, and an adjuster arm 494. The adjuster wall 490 is disposed proximate and is disposed substantially parallel to the second housing wall 424. The adjuster wall 490 is disposed substantially parallel to the first portion 470 and the second portion 472.

The lip 492 extends from a first end 500 of the adjuster wall 490 and extends towards the first cover wall 430. The lip 492 is disposed substantially perpendicular to the adjuster wall 490 and extends over a portion of the second housing wall 424.

The adjuster arm 494 extends from a second end 502 of the adjuster wall 490 and is configured to selectively engage the second portion 472 of the sleeve adjuster 460.

The adjuster arm 494 defines a second engagement surface 510 and a plurality of second engagement elements 512. The second engagement surface 510 is disposed on a face of the adjuster arm 494 that faces towards and end of the piston skirt 444. The second engagement surface 510 is configured as a conical surface, a chamfered surface, a ramped surface, or the like that is complementary to the first engagement surface 450. The second engagement surface 510 is configured to selectively engage or slide along the first engagement surface 450.

The plurality of second engagement elements 512 are disposed on a face of the adjuster arm 494 that faces towards the plurality of first engagement elements 480 of the second portion 472. The plurality of second engagement elements 512 are disposed adjacent to the face that includes the second engagement surface 510. The plurality of second engagement elements 512 are configured to selectively engage the plurality of first engagement elements 480.

Engagement between the first engagement surface 450 and the second engagement surface 510 as well as engagement between the plurality of first engagement elements 480 and the plurality of second engagement elements 512 define a load path through the piston assembly 406, the adjustment assembly 408, and the cover 402 to the bearing assembly 404 and ultimately the clutch assembly 1. As such, the first engagement surface 450 being engaged with the second engagement surface 510 as well as the plurality of the first engagement elements 480 being engaged with the plurality of second engagement elements 512 provides a rigid connection between the piston assembly 406, the conical adjuster 462, the sleeve adjuster 460, the cover 402, and the bearing assembly 404 such that the movement of the piston assembly 406 from the first position towards the second position, as shown in FIG. 11, moves the bearing assembly 404 to move the clutch assembly 1 from a disengaged state towards an engaged state when compressed air is applied to the pneumatic clutch actuator 10.

The release of the compressed air from the pneumatic clutch actuator 10 enables the piston assembly 406 to move from the second position towards the first position as the clutch assembly 1 moves from the engaged state to towards the disengaged state. A first biasing member 514 and a second biasing member 516 are provided with the adjustment assembly 408, to ensure the elimination of a dead volume between the piston head 440 of the piston assembly 406 and the floor 420 of the housing 400.

The first biasing member 514 is disposed between the sleeve adjuster 460 and the piston assembly 406 and is arranged to bias the piston head 440 of the piston assembly 406 towards the floor 420. The rigid connection between the piston assembly 406, the conical adjuster 462, the sleeve adjuster 460, the cover 402, and the bearing assembly 404 is severed, when the first engagement surface 450 engages the second engagement surface 510, to facilitate the biasing of the piston head 440 of the piston assembly 406 towards the floor 420 of the housing 400.

As shown in FIG. 12, the engagement of the lip 492 of the conical adjuster 462 with the second housing wall 424 of the housing 400 while the piston assembly 406 continues to move towards the first position to eliminate the dead volume, the second engagement surface 510 rides along the first engagement surface 450. The riding of the second engagement surface 510 along the first engagement surface 450 causes the conical adjuster 462 to radially displace towards the second housing wall 424 such that the plurality of second engagement elements 512 disengage from the plurality of first engagement elements 480. The disengagement of the plurality of first engagement elements 480 from the plurality of second engagement elements 512 facilitates the first biasing member 514 to urge or bias the piston assembly 406 towards the floor 420 to eliminate the dead volume.

A second biasing member 516 extends between the cover 402 and the conical adjuster 462 and engages the extension wall 434 and the adjuster arm 494. The second biasing member 516 is arranged to bias or urge the second engagement surface 510 of the adjuster arm 494 into engagement with the first engagement surface 450.

In accordance with a fourth exemplary embodiment, a pneumatic clutch actuator 10 is illustrated in FIGS. 13-18.

Referring to FIGS. 13, 14, 15A, 15B, 16A, 16B, 17A-17C, and 18 the pneumatic clutch actuator 10 is configured to selectively change the state of the clutch 2 of the clutch assembly 1 that is operatively connected to the pneumatic clutch actuator 10 between an engaged state and a disengaged state.

The pneumatic clutch actuator 10 includes a housing assembly 610, a bearing assembly 612, a piston assembly 614, and an adjustment assembly 616.

The housing assembly 610 is circumferentially disposed about the transmission input shaft 5 and is configured as an annular housing. The housing assembly 610 includes a first housing member 620 and a second housing member 622. The first housing member 620 is at least partially received within the second housing member 622 and includes a base 630, a first annular wall 632, and an inner annulus 634. The base 630 is disposed about the transmission input shaft 5.

The first annular wall 632 extends from the base 630 and includes an inner surface 640 and an outer surface 642.

The inner annulus 634 extends axially from the base 630 and is spaced apart from the first annular wall 632. The inner annulus 634 extends from the base 630 towards and through the second housing member 622. The inner annulus 634 is disposed substantially concentric with the first annular wall 632 and includes an inner annulus inner surface 650 and an inner annulus outer surface 652. The inner annulus inner surface 650 defines a bore within which the transmission input shaft 5 is received. The inner annulus 634 extends along an axis 658. In at least one embodiment, a sealing boot or dust cover 659 is disposed about a portion of the inner annulus 634 and engages the inner annulus outer surface 652. The dust cover 659 engages a portion of a bearing carrier 710 and is received within a groove defined by the inner annulus outer surface 652.

The second housing member 622 is at least partially disposed about the first housing member 620 and may be configured as an environmental cover to protect components disposed within the first housing member 620 from the ingress of contaminants.

The second housing member 622 includes an outer annular wall 660, an extension wall 662, an inner annular wall 664, and a shoulder 666. The outer annular wall 660 is disposed substantially parallel to the first annular wall 632 and includes a second annular wall inner surface 670 and a second annular wall outer surface 672. The second annular wall inner surface 670 is disposed proximate to and faces towards the outer surface 642.

The extension wall 662 connects the outer annular wall 660 and the inner annular wall 664. The extension wall 662 is disposed substantially perpendicular to the outer annular wall 660 and is disposed substantially parallel to the base 630. The extension wall 662 includes an extension wall inner surface 680 and an extension wall outer surface 682.

The inner annular wall 664 extends from the extension wall 662 and includes a third annular wall inner surface 690 and a third annular wall outer surface 692. The second annular wall inner surface 670, the extension wall inner surface 680, and the third annular wall inner surface 690 define an annular cavity 694. In at least one embodiment, the annular cavity 694 is sized to at least partially receive the first annular wall 632.

The shoulder 666 extends radially inward (with respect to the axis 658) from the inner annular wall 664 towards the inner annulus 634. The shoulder 666 is disposed substantially perpendicular to the inner annular wall 664 and is disposed substantially parallel to the extension wall 662. The shoulder 666 includes a first shoulder surface 700 and a second shoulder surface 702. The first shoulder surface 700 faces away from the base 630. The second shoulder surface 702 faces towards the base 630.

The bearing assembly 612 is at least partially received within the housing assembly 610 and is disposed about the inner annulus 634. The bearing assembly 612 includes a bearing carrier 710 and a bearing 712.

The bearing carrier 710 is slidably disposed about the inner annulus outer surface 652. The bearing carrier 710 slides along the inner annulus outer surface 652 in response to movement of the piston assembly 614 or in response to the application of a force or load onto the bearing assembly 612 by the diaphragm spring 6.

The bearing carrier 710 includes a first bearing carrier portion 720, a second bearing carrier portion 722, and a third bearing carrier portion 724. The first bearing carrier portion 720 is disposed radially between the inner annulus 634 and the bearing assembly 612 and is disposed substantially parallel to the inner annulus 634.

The second bearing carrier portion 722 extends radially outwardly from the first bearing carrier portion 720 to the third bearing carrier portion 724. The second bearing carrier portion 722 is disposed axially (with respect to the axis 658) between the bearing assembly 612 and the adjustment assembly 616. The second bearing carrier portion 722 defines a bearing shoulder.

Figure 14:
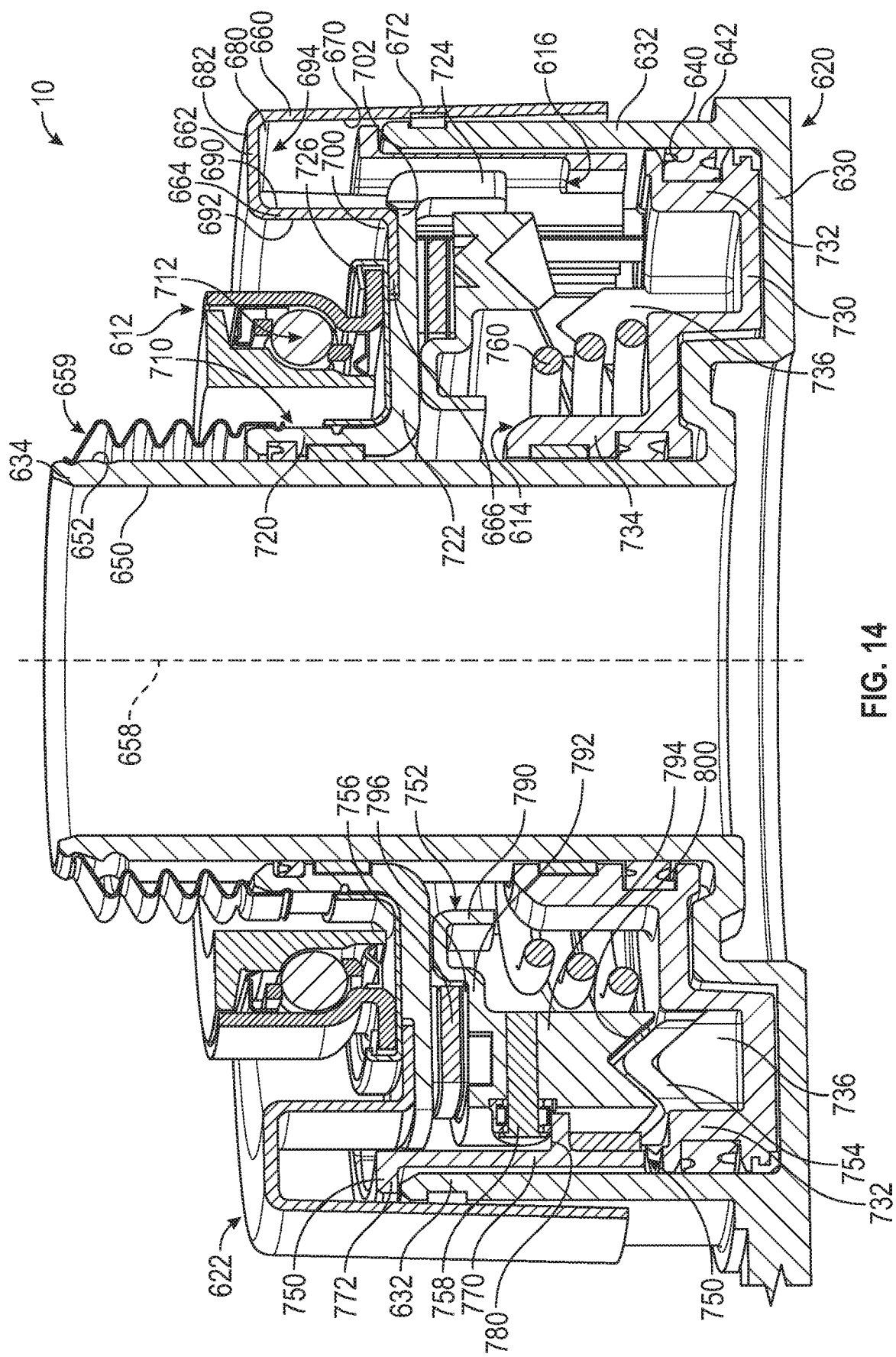
FIG. 14 is a partial cross-sectional view of the pneumatic clutch actuator of FIG. 13.
Figure 16A:
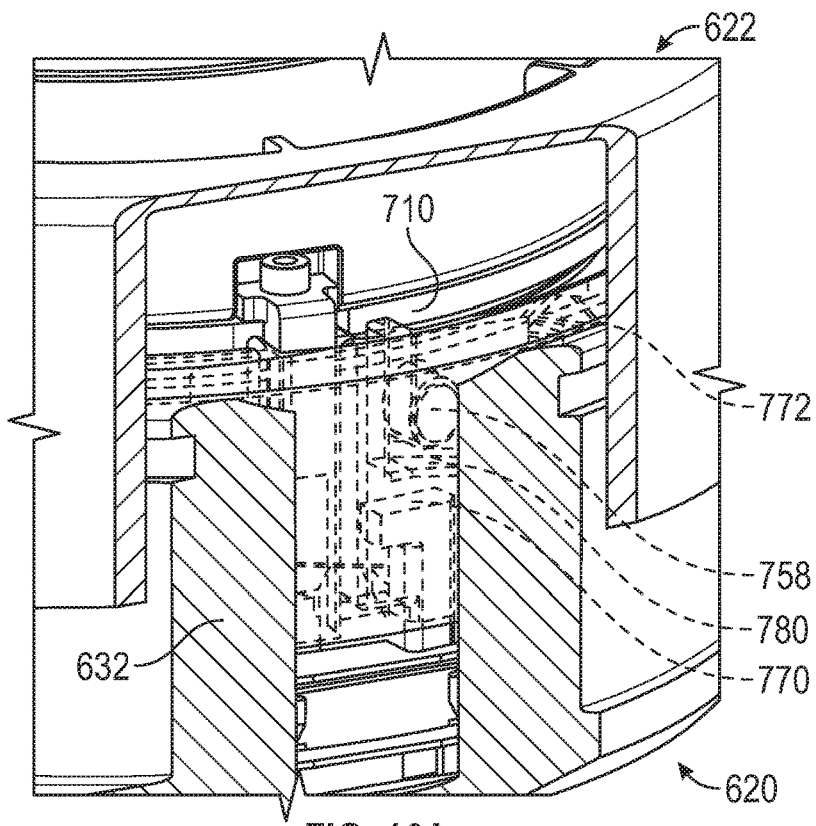
FIGS. 16A and 16B are partial sectional views of the pneumatic clutch actuator of FIG. 13.
Figure 16B:
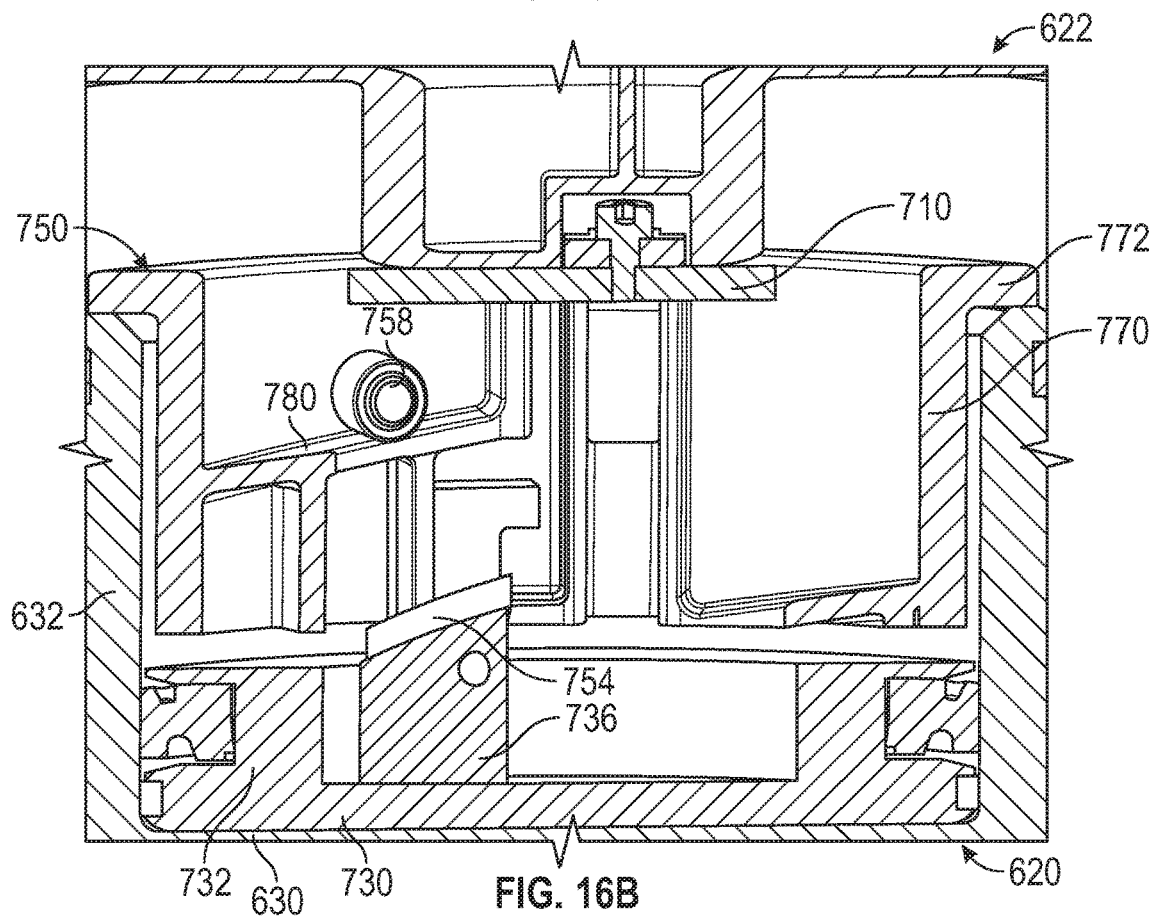
Figure 18:
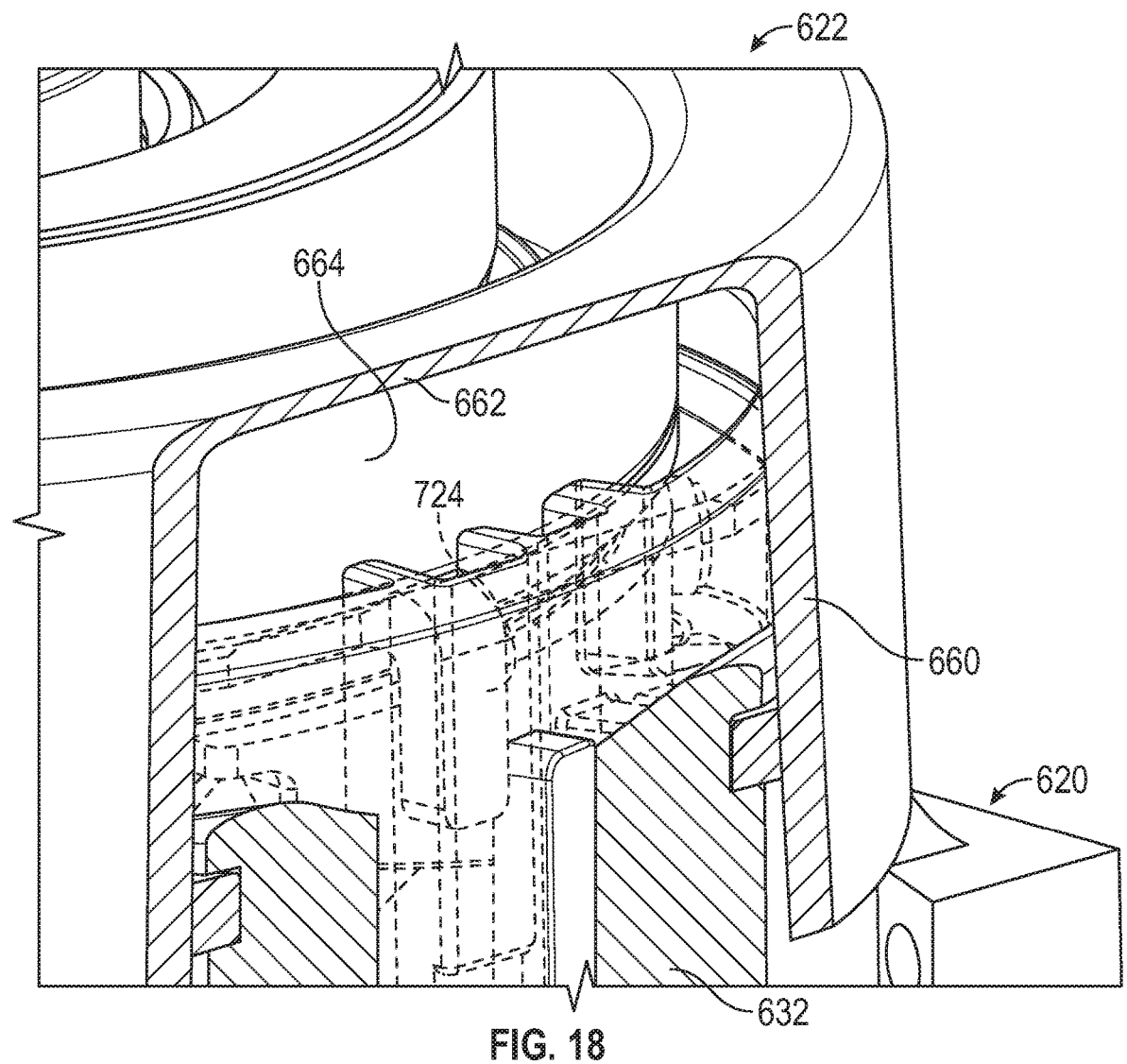
FIG. 18 is a partial sectional view of the pneumatic clutch actuator of FIG. 13.

The third bearing carrier portion 724 extends from the second bearing carrier portion 722. The third bearing carrier portion 724 is disposed substantially perpendicular to the second bearing carrier portion 722 and is disposed substantially parallel to the first bearing carrier portion 720. The third bearing carrier portion 724 extends into a portion of the adjustment assembly 616 such that the bearing carrier 710, the portion of the adjustment assembly 616, and the piston assembly 614 are linked together to inhibit or restrict unintentional rotation between the parts, as shown in FIGS. 14, 16A, and 16B.

The bearing 712 is rotatably supported by the second bearing carrier portion 722. A portion of the shoulder 666 is disposed between and engages portions of the second bearing carrier portion 722 and the bearing 712. A member 726 extends between the bearing 712 and the bearing carrier 710. The member 726 is connected to a portion of the bearing 712 and the second bearing carrier portion 722. The bearing 712 may be configured as a release bearing. The bearing 712 may include an inner race and an outer race with at least one rolling element disposed between the inner race and the outer race.

The piston assembly 614 is slidably received within the first housing member 620. The piston assembly 614 is configured to selectively change a clutch state of a clutch 2 that engages the bearing assembly 612 between an engaged state and a disengaged state. The piston assembly 614 is movable between a first position (FIG. 17A) and a second position (FIG. 17C) in response to the application of compressed air provided from a pneumatic source. The first position of the piston assembly 614 may correspond to the engaged state of the clutch 2 of the clutch assembly 1 (FIG. 1A). The second position of the piston assembly 614 may correspond to the disengaged state of the clutch 2 of the clutch assembly 1 (FIG. 1B).

The piston assembly 614 includes a piston head 730, a first extension member 732, a second extension member 734, and a first adjustment member 736. The piston head 730 is disposed adjacent to the base 630 when the piston assembly 614 is in the first position. Compressed air that is provided to the pneumatic clutch actuator 10 moves the piston assembly 614 from the first position towards the second position. A bottom surface of the piston head 730 is spaced apart from the base 630 when the piston assembly 614 is in the second position, as shown in FIG. 17C. The bottom surface of the piston head 730, the base 630, and the inner surface 640 define a volume 738 that receives the compressed air. The evacuation or releasing of the compressed air from the volume 738 enables the piston assembly 614 to move from the second position towards the first position, as shown in FIG. 14.

The first extension member 732 extends axially from the piston head 730 towards the bearing assembly 612. At least a portion of the first extension member 732 is disposed between the bearing carrier 710 and the inner annulus 634. The second extension member 734 is radially spaced apart from the first extension member 732. The second extension member 734 extends axially from the piston head 730 towards the second housing member 622. The second extension member 734 and the piston head 730 at least partially define a recess 740.

The first adjustment member 736 is at least partially received within the recess 740. The first adjustment member 736 extends towards the bearing carrier 710.

A portion of the clutch assembly 1, such as a diaphragm spring 6, may be configured to engage the bearing assembly 612. The diaphragm spring 6 operates to engage and/or disengage the clutch assembly in response to operation of the pneumatic clutch actuator 10 through the movement of the piston assembly 614 between the first position and the second position. The clutch 2 includes a clutch disc 4 that has a friction surface that may wear during operation to selectively engage or disengage the clutch assembly 1. As the friction surface of the clutch disc 4 of the clutch 2 wears the relative starting position of the bearing 712 may change.

As the piston assembly 614 moves from the second position towards the first position, the piston head 730 of the piston assembly 614 may be spaced apart from the base 630 at the end of its travel. The spacing apart of the piston head 730 from the base 630 when in the first position presents a dead volume between the bottom surface of the piston head 730, the base 630, and the first annular wall 632. The dead volume may require that a pneumatic system supply additional compressed air to move the piston assembly 614 from the first position towards the second position. The dead volume may result in a decreased system response time and decreased system performance. In an attempt to overcome these disadvantages, the adjustment assembly 616 is provided to compensate for the dead volume or to minimize the dead volume in response to wear of the friction surface of the clutch disc of the clutch assembly such that the piston assembly 614 has a substantially consistent starting position throughout the life to the pneumatic clutch actuator 10.

The adjustment assembly 616 includes a guide member 750, a second adjustment member 752, a friction pad 754, a first low friction interface component 756, a second low friction interface component 758, and a biasing member 760. In at least one embodiment, the first adjustment member 736 is provided as part of the adjustment assembly 616. In at least one embodiment, the first adjustment member 736 is provided as part of the piston assembly 614 and is attached to the piston head 730.

The guide member 750 is radially disposed between the first annular wall 632 and the second adjustment member 752. The guide member 750 is axially disposed between the piston assembly 614 and the extension wall 662 of the second housing member 622.

The guide member 750 includes a guide body 770 and a lip 772. The guide body 770 defines an adjustment ramp 780 that is inclined toward or is declined away from the lip 772.

The lip 772 extends from the guide body 770 towards the outer annular wall 660 of the second housing member 622. The lip 772 is configured to selectively engage a portion of the first annular wall 632. The lip 772 engages the first annular wall 632 as the piston assembly 614 moves towards the base 630 of the first housing member 620 (e.g. towards the first position). The lip 772 is spaced apart from the first annular wall 632 as the piston assembly 614 moves away from the base 630 of the first housing member 620 (e.g. towards the second position).

The second adjustment member 752 is disposed about the inner annulus 634. The second adjustment member 752 is axially disposed between the bearing carrier 710 and the first adjustment member 736 or the piston assembly 614. The second adjustment member 752 includes a first portion 790, a second portion 792, and a third portion 794.

The second portion 792 extends from and is disposed substantially perpendicular to the first portion 790. In at least one embodiment, the second portion 792 is disposed proximate the second bearing carrier portion 722.

The second portion 792 defines a region 796 that is sized to receive the first low friction interface component 756. The first low friction interface component 756 is slidingly or rollingly disposed between the second bearing carrier portion 722 of the bearing carrier 710 and the second portion 792 of the second adjustment member 752. The first low friction interface component 756 provides a low friction interface between the bearing carrier 710 and the second adjustment member 752.

The third portion 794 extends from the second portion 792 towards the first adjustment member 736. The third portion 794 is disposed substantially perpendicular to the second portion 792 and is disposed substantially parallel to the first portion 790. The third portion 794 is configured as a notch or is provided with a general chevron shape that is arranged to receive the first adjustment member 736 that is configured as a wedge or complementary chevron shape to the general chevron shape of the third portion 794.

The second low friction interface component 758 extends from the third portion 794 and is configured to move or slide relative to the adjustment ramp 780 of the guide member 750.

The third portion 794 defines a friction surface 800. The friction surface 800 is configured as a stepped interface or a ramp that is inclined towards or is declined away from the second portion 792 of the second adjustment member 752. The friction surface 800 has a substantially similar pitch as the adjustment ramp 780 but is inclined or declined in a direction complementary to the inclination or declination of the adjustment ramp 780. The friction surface 800 is configured to at least partially receive the friction pad 754 that is disposed on a portion of the first adjustment member 736. The friction pad 754 is configured to selectively engage the friction surface 800 as the piston assembly 614 moves towards the second adjustment member 752.

The biasing member 760 is disposed between the piston assembly 614 and the second adjustment member 752. The biasing member 760 is configured to engage the piston head 730 of the piston assembly 614 and the second portion 792 of the second adjustment member 752. The biasing member 760 is configured to provide a torsional/rotational biasing force and an axial biasing force. The biasing member 760 is arranged to impart a rotational force to the second adjustment member 752 as the piston assembly 614 moves towards the base 630 of the first housing member 620. The rotational force causes the second adjustment member 752 to rotate relative to the guide member 750 such that the second low friction interface component 758 rides or runs along the adjustment ramp 780 of the guide member 750 to adjust a total length of the piston assembly 614 along the axis 658, as shown in FIGS. 13, 15A, and 16A-16B.

Figure 15A:
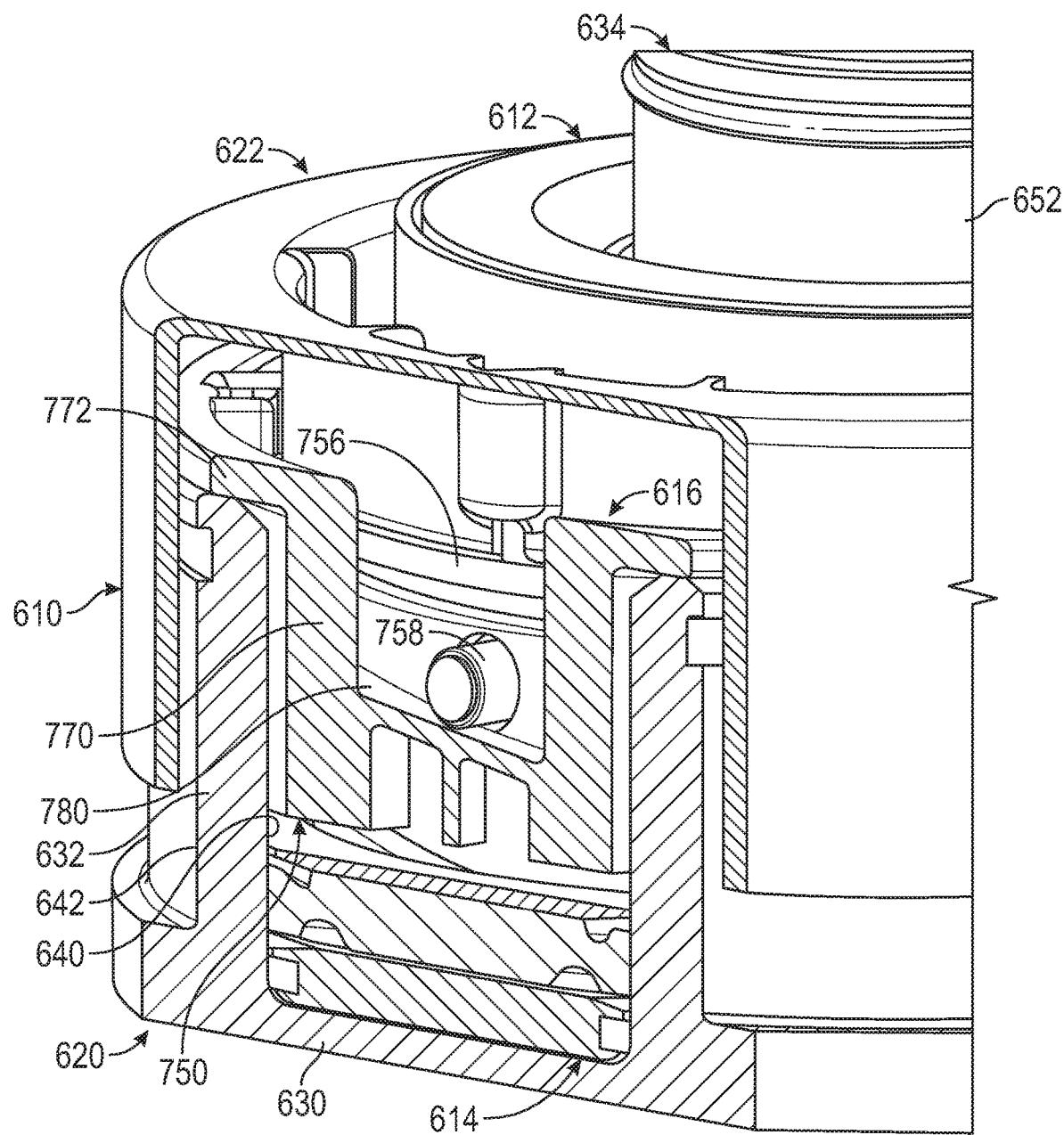
FIGS. 15A and 15B are partial sectional views of the pneumatic clutch actuator of FIG. 13.
Figure 15B:
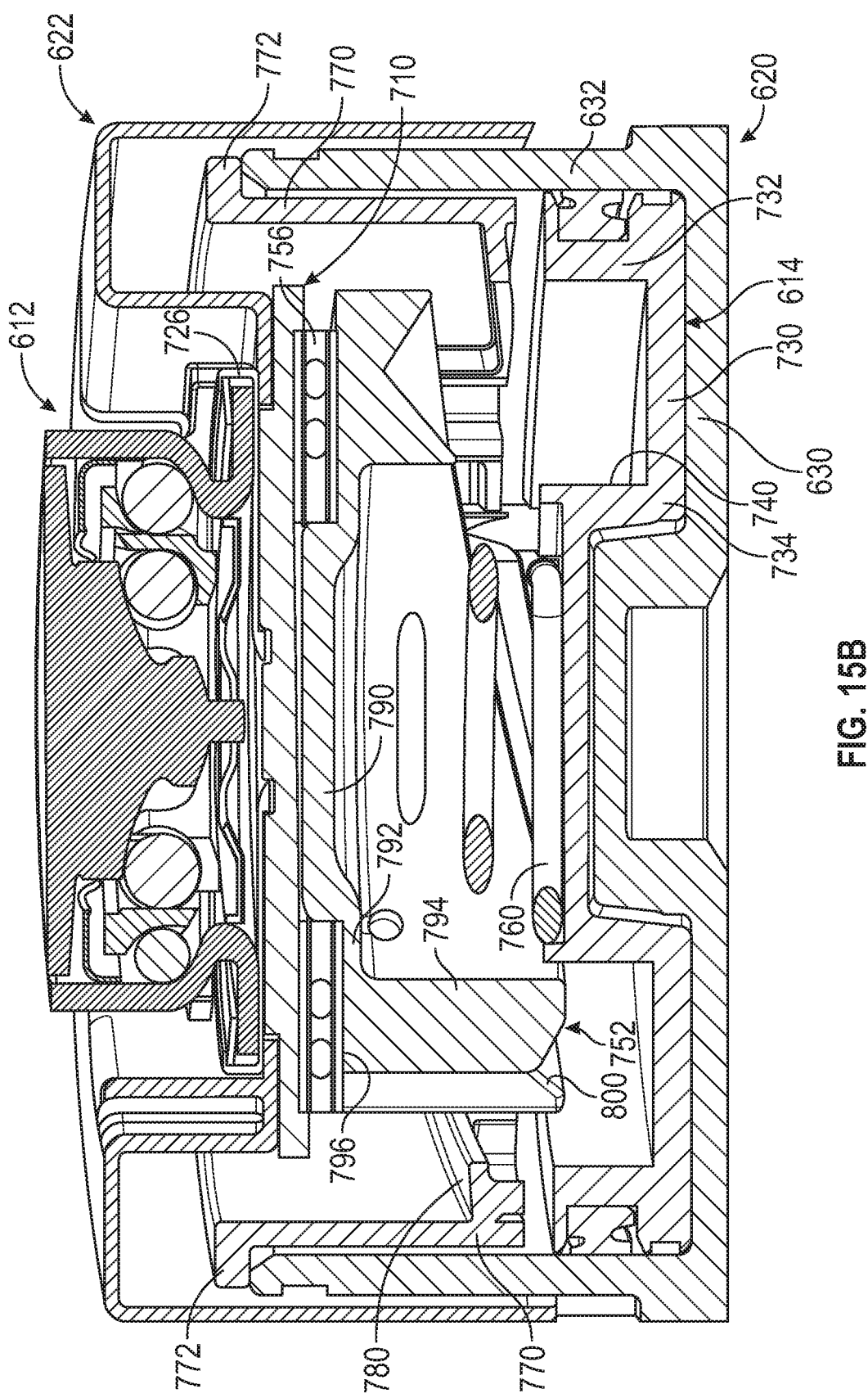

Referring to FIGS. 15A-15B, a portion of the clutch 2, such as a diaphragm spring 6, is configured to engage the bearing assembly 612. The diaphragm spring 6 may apply a load or a force to the bearing assembly 612 such that the second adjustment member 752 moves towards the first adjustment member 736. The biasing member 760 applies a biasing force such that the second adjustment member 752 attempts to rotate relative to the guide member 750 to adjust the total length of the piston assembly 614.

Referring to FIGS. 17A-17C, as compressed air is supplied to the pneumatic clutch actuator 10, the piston assembly 614 moves from the first position towards the second position to disengage the clutch 2, as shown in FIG. 17A. As the piston assembly 614 moves towards the bearing assembly 612, the friction pad 754 disposed on the first adjustment member 736 engages the friction surface 800 of the second adjustment member 752, as shown in FIG. 17B. The engagement of the friction pad 754 with the friction surface 800 inhibits relative rotation between the second adjustment member 752, the first adjustment member 736, and the piston assembly 614 and enables the piston assembly 614 to move the guide member 750 and the bearing carrier 710 to move the bearing assembly 612, as shown in FIG. 17C.

Referring to FIGS. 13, 14, 15A, and 15B, when compressed air is no longer supplied to the pneumatic clutch actuator 10, the diaphragm spring 6 and/or the biasing member 760 urges the piston assembly 614 to move from the second position towards the first position to engage the clutch 2. As the piston assembly 614 moves towards the base 630 of the first housing member 620 the lip 772 engages the first annular wall 632 causing the friction pad 754 disposed on the first adjustment member 736 to separate from the friction surface 800 of the second adjustment member 752 enabling the second adjustment member 752 to rotate relative to the guide member 750 such that the second low friction interface component 758 rides along the adjustment ramp 780 of the guide member 750 to maintain or adjust a total length of the piston assembly 614 to minimize the dead volume or maintain a substantially constant stroke of the piston assembly 614.

While the present disclosure has been described with reference to exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed, but that the present disclosure will include all embodiments falling within the scope of the application.

What is claimed is:

1. A pneumatic clutch actuator for a clutch assembly, comprising:
    an actuator housing;
    a piston assembly disposed within the actuator housing and movable between a first position and a second position, the piston assembly configured to selectively change a clutch state between an engaged state and a disengaged state, the piston assembly having a piston head, an elongate member extending from the piston head, and a lock ring coupled to the elongate member;
    a bearing carrier that supports a bearing, the bearing carrier slidably disposed on a portion of the actuator housing;
    a locking element operatively connected directly to the piston assembly and engages the bearing carrier to adjust a total length of the piston assembly as the piston assembly moves from the second position towards the first position to compensate for wear of the clutch assembly; and
    a release ring connected to the actuator housing, the release ring having a collar that selectively engages the locking element in response to movement of the piston assembly from the second position to the first position, the release ring extending through a slot formed within the elongate member.

2. The pneumatic clutch actuator of claim 1, wherein the collar extends from an end of the release ring.

3. A pneumatic clutch actuator for a clutch assembly, comprising:
- an actuator housing;
- a piston assembly disposed within the actuator housing and movable between a first position and a second position, the piston assembly configured to selectively change a clutch state between an engaged state and a disengaged state, the piston assembly having a piston head, an elongate member extending from the piston head, and a lock ring coupled to the elongate member;
- a bearing carrier that supports a bearing, the bearing carrier slidably disposed on a portion of the actuator housing;
- a locking element operatively connected to the piston assembly and engages the bearing carrier to adjust a total length of the piston assembly as the piston assembly moves from the second position towards the first position to compensate for wear of the clutch assembly; and
- a release ring connected to the actuator housing, the release ring having a collar that selectively engages the locking element in response to movement of the piston assembly from the second position to the first position, the release ring extending through a slot formed within the elongate member, wherein the collar extends from an end of the release ring, and wherein the locking element includes a first locking element end received within a groove that is defined by the elongate member and the lock ring and a second locking element end that engages the bearing carrier.

4. The pneumatic clutch actuator of claim 3, wherein while the piston assembly is in the first position the piston head is disposed proximate a floor of the actuator housing and the collar engages the second locking element end to pivot the locking element to adjust the total length of the piston assembly.

5. The pneumatic clutch actuator of claim 4, wherein while the piston assembly is in the second position, the piston head is spaced apart from the floor and the collar is spaced apart from the second locking element end.

* * * * *